US007240153B2

(12) United States Patent
Taninaka et al.

(10) Patent No.: US 7,240,153 B2
(45) Date of Patent: Jul. 3, 2007

(54) STORAGE SYSTEM AND CONTROL METHOD THEREOF FOR UNIFORMLY MANAGING THE OPERATION AUTHORITY OF A DISK ARRAY SYSTEM

(75) Inventors: Dai Taninaka, Odawara (JP); Toshimichi Kishimoto, Hadano (JP)

(73) Assignee: Hitachi, Ltd., Tokyo (JP)

( * ) Notice: Subject to any disclaimer, the term of this patent is extended or adjusted under 35 U.S.C. 154(b) by 251 days.

(21) Appl. No.: 10/855,408

(22) Filed: May 28, 2004

(65) Prior Publication Data

US 2005/0216664 A1 Sep. 29, 2005

(30) Foreign Application Priority Data

Mar. 29, 2004 (JP) ............................. 2004-094608

(51) Int. Cl.
G06F 12/16 (2006.01)
G06F 12/00 (2006.01)
(52) U.S. Cl. ..................... 711/114; 711/147; 711/170
(58) Field of Classification Search ..................... None
See application file for complete search history.

(56) References Cited

U.S. PATENT DOCUMENTS

| 6,105,085 | A | 8/2000 | Farley |
| 6,425,049 | B1 | 7/2002 | Yamamoto et al. |
| 6,480,953 | B1 | 11/2002 | Hughes |
| 6,584,499 | B1 | 6/2003 | Jantz et al. |
| 2003/0033478 | A1* | 2/2003 | Fujimoto et al. ............ 711/114 |
| 2003/0126394 | A1 | 7/2003 | Fowler |
| 2003/0154281 | A1 | 8/2003 | Mitsuoka et al. |
| 2005/0021908 | A1 | 1/2005 | Ohno et al. |
| 2005/0108474 | A1 | 5/2005 | Zhang et al. |

FOREIGN PATENT DOCUMENTS

| JP | 06095859 | 4/1994 |
| JP | 10-164054 | * 11/1998 |

OTHER PUBLICATIONS

Mylex, Global Array Manager Client Software v2.11 Installation Guide and User Manual, Part No. 771961-D03, 1997.

* cited by examiner

Primary Examiner—Kevin L. Ellis
Assistant Examiner—Craig E Walter
(74) Attorney, Agent, or Firm—Mattingly, Stanger, Malur & Brundidge, P.C.

(57) ABSTRACT

In an exclusive lock management in common to both the In-Band and the Out-of-band, a lock control technique of a storage system capable of removing the factor that may cause the discrepancy in the configuration information in a disk array system is disclosed. In the storage system, a shared memory in a DKC of a storage subsystem has lock management information for uniformly managing the operation authority for the configuration information in the shared memory that is used in common by both the channels of the host terminals and the management client terminals, and a CPU in the DKC gives the operation authority for changing the configuration information to either the host machine or the management client based on the lock management information in the shared memory in response to an access request from the host terminals or the management client terminals.

21 Claims, 14 Drawing Sheets

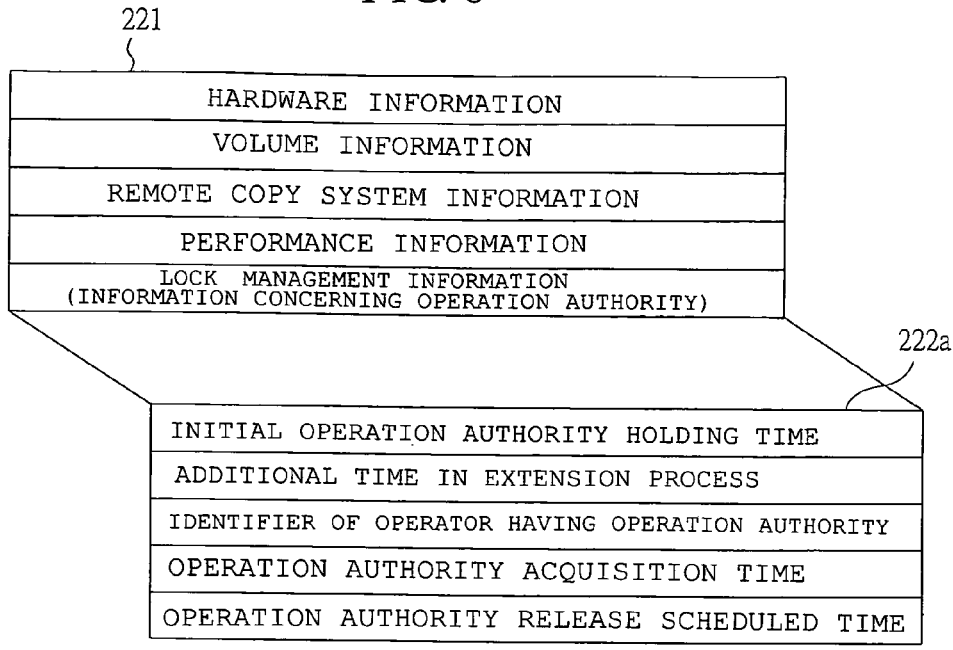
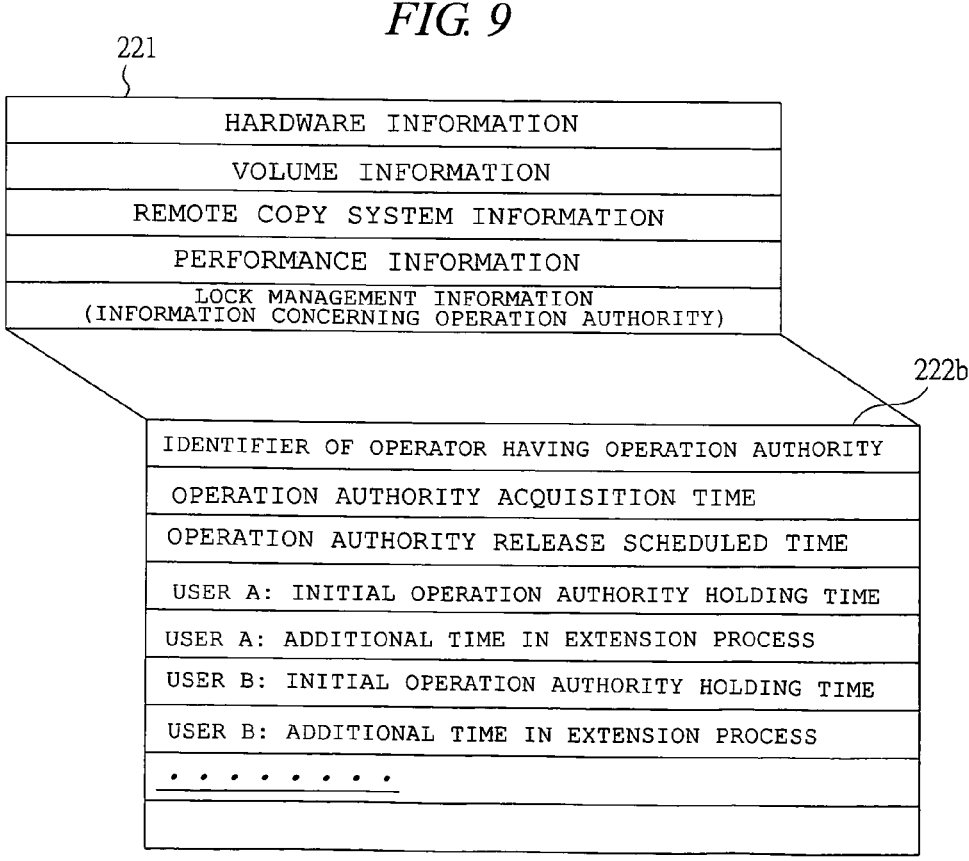

| | |
|---|---|
| Status A | XX minutes until lock is released. |
| Status B | XX minutes until lock is released. |
| Status C | XX minutes until lock is released. |
| Status D | The lock is almost released. (Remaining time is XX minutes.) |
| Status E | The lock has been released. |

FIG. 13

| No. | OPERATION | COMMAND NAME |
|---|---|---|
| 1 | OPERATION AUTHORITY (Modify) ACQUISITION FUNCTION | Getmodify |
| 2 | OPERATION AUTHORITY (Modify) RELEASE FUNCTION | Freemodify |
| 3 | OPERATION AUTHORITY (Modify) EXTENSION FUNCTION | Extensiontime |
| 4 | OPERATION AUTHORITY (Modify) FORCED RELEASE FUNCTION | Freemodify-force |
| 5 | REMAINING TIME ACQUISITION FUNCTION | Getrimaintime |
| 6 | ACQUISITION FUNCTION OF IDENTIFIER OF OPERATOR HAVING OPERATION AUTHORITY (Modify) | Getmodifieduserid |

(1) ACQUISITION OF OPERATION AUTHORITY                400,450

>Getmodify UserID
You get modify mode.

(2) ACQUISITION OF OPERATION AUTHORITY REMAINING TIME

>Getrimaintime UserID
Your rimain time is 15 minute.

(3) EXTENSION INSTRUCTION OF OPERATION AUTHORITY

>Getrimaintime UserID
Your rimain time is 15 minute
>Extensiontime UserID
Your rimain time is 30 minute.

(4) RELEASE OF OPERATION AUTHORITY

>Freemodify UserID
You released modify mode.

(5) ACQUISITION OF IDENTIFIER OF OPERATOR HAVING OPERATION AUTHORITY

>Getmodifieduseri
   Modify mode had *userID*

STORAGE SYSTEM AND CONTROL METHOD THEREOF FOR UNIFORMLY MANAGING THE OPERATION AUTHORITY OF A DISK ARRAY SYSTEM

CROSS-REFERENCE TO RELATED APPLICATION

The present application claims priority from Japanese Patent Application No. JP 2004-094608 filed on Mar. 29, 2004, the content of which is hereby incorporated by reference into this application.

TECHNICAL FIELD OF THE INVENTION

The present invention relates to a storage system and a control method thereof, more particularly, it relates to a technique effectively applied to the uniform management of the authority for changing the configuration information in the disk array system from a host machine and a management client in a storage system having the host machines and the management clients that are connected respectively via physically and logically different and separate networks/interfaces to the disk array system.

BACKGROUND OF THE INVENTION

According to the examinations by the inventors of the present invention, the followings are known as the conventional storage systems and the control techniques thereof.

For example, in a storage system according to the prior art, the SAN (Storage Area Network) environment in which storages of large capacity and high functionalities are built on the network has been developed. Also, since various types of host machines are connected, data compatibility means is required and the needs for NAS (Network Attached Storage) in the SAN environment have been increased. Under these circumstances, a manager to manage and control the storages on the SAN environment has become indispensable. For example, as for the connection between storages and host machines in the SAN environment, Block Storage access of SCSI (Small Computer System Interface) by FibreChannel is used, and on the other hand, in the NAS environment, the connection is done by network protocols such as NFS (Network File System) by the Ethernet (registered trademark) and so forth.

The control techniques of these storage systems include an In-Band method in which a storage interface with host machines is used and an Out-of-Band method in which other interface physically and logically different from the interface to acquire the storage data from host machines is used. These methods are selectively employed depending on the respective purposes and the conditions of the applications and the interfaces loaded in the host machines. In order to use both of the methods, a technique is disclosed in Japanese Patent Application Laid-Open Publication No. 2003-241903, in which the connections in the storage system are unified by the interface for storage access and the interface for management control, and the storage data and the storage management control are realized by using the single connection network.

SUMMARY OF THE INVENTION

Meanwhile, examinations by the inventors of the present invention on such conventional storage systems and the control techniques thereof have revealed the followings.

For example, in the conventional control techniques of the storage system, as mentioned above, there are plural channels such as In-Band method and Out-of-Band method as the interface for storage control, and the storage data and the storage management control can be realized with the single connection network. However, there has been no consideration for the prevention of the simultaneous access in the case where the configuration information is changed on both the In-Band side and the Out-of-Band side.

More specifically, in the conventional control techniques of the storage system, lock management information is managed on the SVP (storage management software) side of the management terminal, and in the storage management software, the exclusive lock management is performed only at the terminal (user) on the Out-of-band side. Therefore, the configuration can be changed at the terminal of the host machines on the In-Band side while the configuration is being changed at the terminal of the management client on the Out-of-Band side. This is because, in the case of the Out-of-Band, the configuration information is acquired once on the management client side, and the configuration change process is carried out based on the acquired information. Therefore, if the configuration change process is executed from the In-Band side after the configuration information is acquired on the management client side and before the configuration change process is carried out, there will be a discrepancy between the configuration information that has been acquired on the management client side and the configuration information that is actually defined on the disk control device side. For this reason, it is necessary to limit the number of channel/user that carries out the configuration change to one channel (one user).

Accordingly, an object of the present invention is to provide a lock control technique of a storage system capable of removing the factors causing the discrepancy in the configuration information by the uniform management of the authority for changing the configuration information in the disk array system from the host machine and the management client in the exclusive lock management in common to both the In-Band and the Out-of-Band.

Also, in the conventional storage control techniques, the storage management software is used in an environment in which plural users log in (access) at one time. However, the number of users having the authority for changing the storage configuration on the storage management software is limited to one user, namely, the exclusive lock is necessary. Other users can only browse. However, when the user having the authority for changing the configuration leaves a terminal unused with holding the authority for a long time, the trouble occurs when other users not having the authority want to change the configuration.

For this reason, a method is adopted in which the user with the operation authority sets the length of time to hold the authority and carries out operations such as the configuration change within the set length of time. However, there is a case where the user cannot complete all the operations for the aimed configuration change within the set length of time, and the time limit expires in the course of the operations, as a result, the user fails to carry out the aimed configuration change.

For its prevention, another object of the present invention is to provide a lock control technique of a storage system in which the time limit for a user with the operation authority for the configuration change is displayed on a screen to show it to the user and the time limit is extended when all the operations for the configuration change are not completed within the time limit.

The above and other objects and advantages of the present invention will become apparent from the detailed description and the accompanying drawings of this specification.

The outline of a representative aspect of the present invention is briefly described as below.

The present invention is applied to a storage system and to a control method thereof that has a disk array system, a host machine connected to the disk array system via a first network/interface, and a management client connected to the disk array system via a second network/interface. The disk array system comprises: plural storage devices that execute writing and reading data to and from memory areas; a storage device control unit that controls writing and reading data to and from the plural storage devices; a channel control unit that receives a write request or a read request from the outside network of the own disk array system; a shared memory to which control information communicated by the channel control unit and the storage device control unit is stored; a cache memory to which data communicated between the channel control unit and the storage device control unit is temporarily stored; a connection unit that is connected to the channel control unit, the storage device control unit, the shared memory and the cache memory; and a management terminal that is connected to the channel control unit, the storage device control unit and the shared memory and controls the own disk array system.

More specifically, in the storage system according to the present invention, the shared memory in the disk array system has management information for uniformly managing the operation authority for the configuration information in the shared memory that is used in common by both the channels of the host machine and the management client, and the channel control unit gives the operation authority for changing the configuration information to either the host machine or the management client in response to an access request from the host machine or the management client based on the management information in the shared memory.

In concrete, in the storage system according to the present invention, an identifier of the operator having the operation authority, acquisition time of the operation authority, and release scheduled time of the operation authority are provided as the management information, and the channel control unit gives the operation authority with the time limit from the acquisition time to the release scheduled time to the operator who has the operation authority based on the operator identifier, the acquisition time, and the release scheduled time. Further, initial operation authority holding time is provided as the management information, and the channel control unit determines the time limit from the acquisition time to the release scheduled time based on the initial operation authority holding time. This initial operation authority holding time can be changed from the host machine or the management client by the operator who has the operation authority. Furthermore, the initial operation authority holding time is held in each of the host machines or the management clients and can be changed by each of the host machines or the management clients.

Also, in addition to the initial operation authority holding time, the additional time in the time-extension process is provided as the management information in the storage system according to the present invention, and when the channel control unit receives a time-extension request from an operator who has the operation authority, the channel control unit changes the release scheduled time of the operation authority based on the additional time in the time-extension process and gives the operation authority with the time limit until the changed release scheduled time. This additional time in the time-extension process can be changed by an operator who has the operation authority from the host machine or the management client. Furthermore, the additional time in the time-extension process can be held in each of the host machines or the management clients and it can be changed in each of the host machines or the management clients.

Further, in the storage system according to the present invention, the channel control unit displays the time limit for a user having the operation authority on a screen of the host machine or the management client so as to show it to the user. Also, even when the release scheduled time of the operation authority is changed in the time-extension process, the channel control unit displays the changed time limit for a user on a screen of the host machine or the management client so as to show it to the user.

Effects to be obtained by representative aspects of the present invention will be briefly described as below.

According to the present invention, in the exclusive lock management in common to both the In-Band and the Out-of-Band, the authority for changing the configuration information in the disk array system from the host machine and the management client is uniformly managed. By so doing, it is possible to remove any factor that may cause the discrepancy in the configuration information.

Moreover, according to the present invention, the time limit for a user having the operation authority for the configuration change is displayed on a screen so as to show it to the user and the time limit can be extended in the case where all the operations for the configuration change are not completed within the time limit.

BRIEF DESCRIPTION OF THE DRAWINGS

FIG. 8 is a schematic diagram showing lock management information defined in common to respective terminals in a storage system according to an embodiment of the present invention;

FIG. 9 is a schematic diagram showing lock management information defined in each of the terminals in a storage system according to an embodiment of the present invention;

FIG. 10 is a schematic diagram showing the screen of a management client terminal in a storage system according to an embodiment of the present invention;

FIG. 12 is a schematic diagram showing character strings to be displayed on the indicator in a storage system according to an embodiment of the present invention;

FIG. 13 is a schematic diagram showing the relations between each of the operations at a host terminal and commands in a storage system according to an embodiment of the present invention;

FIG. 14 is a schematic diagram showing operation procedures at a host terminal in a storage system according to an embodiment of the present invention.

DESCRIPTION OF THE PREFERRED EMBODIMENTS

The embodiments of the present invention will be described in more details with reference to the accompanying drawings. Note that the same reference symbols are allotted to the components having the same function throughout the explanatory drawings to describe the embodiments and repeated explanation thereof is omitted hereinafter.

Concept of the Invention

The present invention is applied to a storage system having a disk array system, a host machine connected to the disk array system via a network/interface (In-Band), and a management client connected to the disk array system via another physically and logically different network/interface (Out-of-Band).

The disk array system comprises: plural disk drives (storage devices) that execute writing and reading data to and from memory areas; a disk controller (storage device control unit) that controls writing and reading data to and from the plural disk drives; a channel controller (channel control unit) that receives a write request or a read request from outside network of the own disk array system; a shared memory to which control information communicated by the channel controller and the disk controller is stored; a cache memory to which data communicated between the channel controller and the disk controller is temporarily stored; a switch (connection unit) that is connected to the channel controller, the disk controller, the shared memory and the cache memory; and a service processor (management terminal) that is connected to the channel controller, the disk controller and the shared memory and controls the own disk array system.

In the configuration of such a storage system as mentioned above, especially, the shared memory in the disk array system has control information to uniformly manage the operation authority for the configuration information in the shared memory that is used in common by both the channels of the host machine (In-Band) and the management client (Out-of-Band). Therefore, the channel controller gives the operation authority for changing configuration information to either the host machine or the management client in response to an access request from the host machine or the management client based on the control information in the shared memory.

Example of Entire Configuration of Storage System

Figure 1:
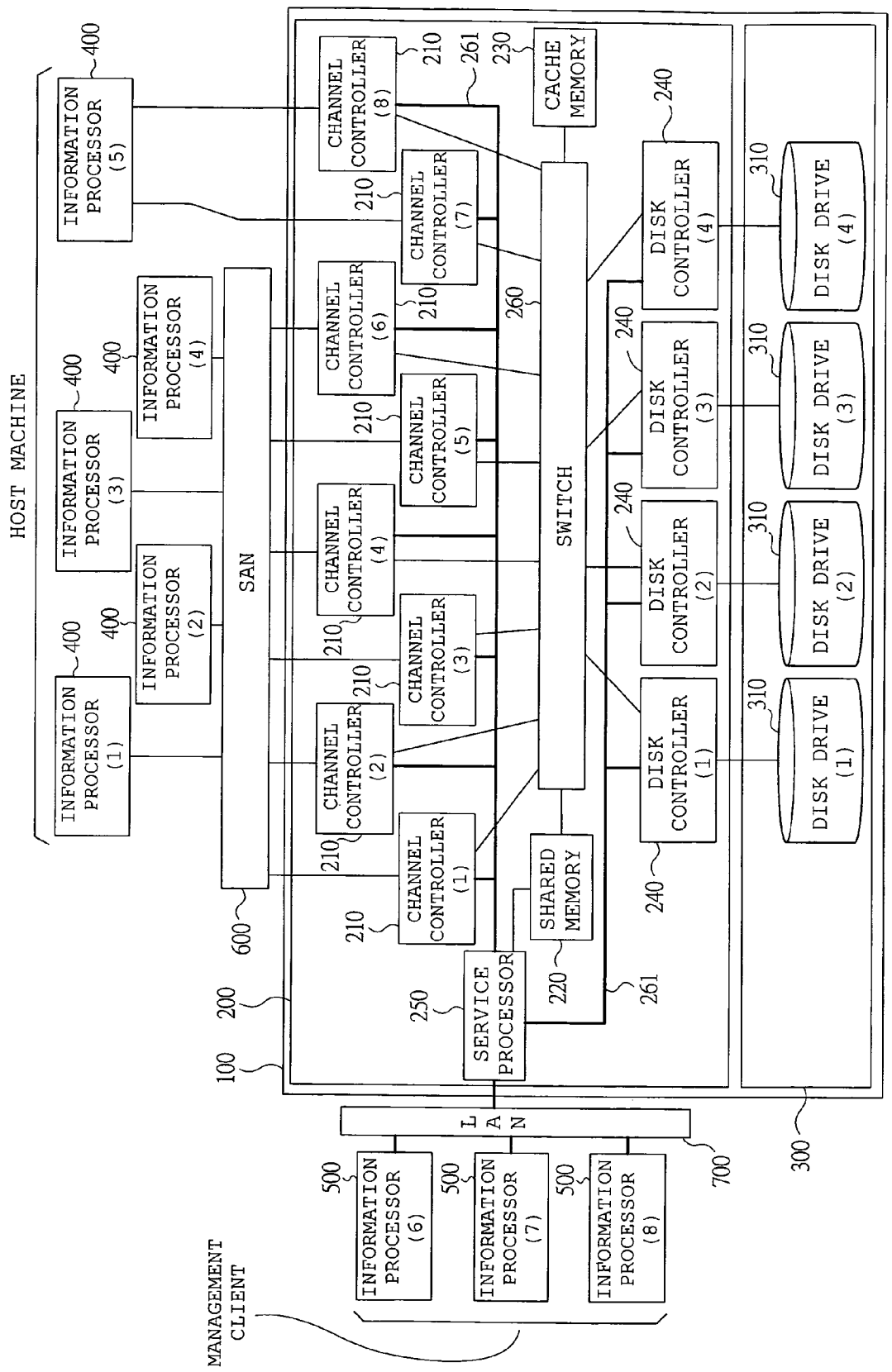
FIG. 1 is a schematic diagram showing the entire configuration of a storage system according to an embodiment of the present invention.

An example of the entire configuration of a storage system according to an embodiment of the present invention will be described with reference to FIG. 1. FIG. 1 is a schematic diagram showing the entire configuration of a storage system according to an embodiment of the present invention.

The storage system according to this embodiment comprises: a disk array system 100; information processors 400 and 450 of a host machine; and information processors 500 of a management client.

The disk array system 100 is provided with a disk controller 200 and a disk driver 300. The disk controller 200 for example controls the disk driver 300 according to the commands received from the information processors 400 and 450 of the host machine. For instance, the disk controller 200 receives a data I/O request from the information processors 400 and 450 of the host machine and reads and writes the data stored in a disk drive 310 provided in the disk driver 300. Also, the disk controller 200 for example receives various commands to manage the disk array system 100 from the information processors 500 of the management client and performs various settings of the disk array system 100.

The information processors 400, 450 and 500 of the host machine and the management client are information devices such as computers provided with CPUs and memories. Various programs are executed by the CPUs in the information processors 400, 450 and 500, thereby various functions are realized. The information processors 400, 450 and 500 may be for example personal computers or workstations, or may be mainframe computers. Especially, the information processors 400 and 450 of the host machine are used as the core computers in for example automatic teller machines at banks, seat reservation systems at airports and so forth. Also, the information processors 500 of the management client are used as management computers to maintain and manage the disk array system 100.

Here, the information processors 400, 450, and 500 of the host machine and the management client may be information processors of different users. For example, the information processors (1) and (2) 400 of the host machine and the information processor (6) 500 of the management client may be the information processors of user A, while the information processors (3) to (5) 400 and 450 of the host machine and the information processor (7) 500 of the management client may be the information processors of user B. In addition, the information processor (8) 500 of the management client may be the information processor of an administrator who manages the entire system of the disk array system 100. Here, a user may be a company, or a department and a section in a company or a personal user.

In FIG. 1, the information processors 400 of the host machine are connected for communication via the SAN (Storage Area Network) 600 to the disk controller 200. The SAN 600 is a network to receive and send data with the information processors 400 of the host machine with using the block as a unit. In this case, the block is a data management unit in memory resources that the disk driver 300 provides. Communications between the information processors 400 of the host machine and the disk controller 200 carried out via the SAN 600 are performed according to for example FibreChannel protocol. A data access request in the block unit is sent according to FibreChannel protocol from the information processors 400 of the host machine to the disk array system 100.

In addition, the information processor 450 of the host machine is connected for communication with the disk controller 200 directly without any network such as SAN or the like. Communications between the information processor 450 of the host machine and the disk controller 200 directly without any network are carried out according to the communication protocols, for example, FICON (Fibre Connection) (registered trademark), ESCON (Enterprise System Connection) (registered trademark), ACONARC (Advanced Connection Architecture) (registered trademark), FIBARC (Fibre Connection Architecture) (registered trademark) and so forth. From the information processor 450 of the host machine, a data access request in the block unit is sent to the disk array system 100 according to these communication protocols.

Of course, the connection between the information processors 400 and 450 of the host machine and the disk controller 200 is not limited to the case where they are connected via the SAN 600 or directly without the SAN. For example, they may be connected via a LAN (Local Area Network), too. In the case of the connection via the LAN, communications may be performed according to, for example, TCP/IP (Transmission Control Protocol/Internet Protocol) protocol.

Also, the information processors 500 of the management client are connected to the disk controller 200 via a LAN 700. The LAN 700 may be the Internet or an exclusive network. Communications between the information processors 500 of the management client and the disk controller 200 carried out via the LAN 700 are performed according to for example TCP/IP protocol. From the information processors 500 of the management client, a data access request by file name designation (a data I/O request in the file unit) is sent to the disk array system 100.

Disk Driver

The disk driver 300 is provided with many disk drives 310. Therefore, the disk driver 300 can provide a large capacity of memory areas to the information processors 400 and 450 of the host machine and the information processors 500 of the management client. The disk drives 310 may be configured by data storage media such as hard disk drives or plural hard disk drives configuring RAID (Redundant Arrays of Inexpensive Disks) Also, a logic volume as a logic memory area can be set in the physical volume as a physical memory area provided by the disk drives 310.

The disk controller 200 and the disk driver 300 may be connected directly with each other as shown in FIG. 1 or may be connected via a network. Further, the disk driver 300 may be configured integrally with the disk controller 200.

Disk Controller

The disk controller 200 comprises: channel controllers 210; a shared memory 220; a cache memory 230; disk controllers 240; a service processor 250; and a switch 260. The disk controller 200 performs communications with the information processors 400 and 450 of the host machine by the channel controllers 210 via the SAM 600 or directly without any network.

The channel controllers 210 are provided with communication interfaces to communicate with the information processors 400 and 450 of the host machine and the information processors 500 of the management client and have a function to receive and send data I/O commands with the information processors 400, 450, and 500 of the host machine and the management client. Further, the channel controllers 210 also have a function to give the operation authority to change the configuration information to one of the information processors 400 and 450 of the host machine and the information processors 500 of the management client, which is described later.

Each of the channel controllers 210 is connected with one another together with the service processor 250 via an internal LAN 261. Therefore, micro programs and the like that are run by the channel controllers 210 can be sent from the service processor 250 and installed thereinto.

The switch 260 connects the channel controllers 210, the shared memory 220, the cache memory 230, the disk controllers 240, and the service processor 250 mutually. The transmission of data and commands among the channel controllers 210, the shared memory 220, the cache memory 230, the disk controllers 240, and the service processor 250 is carried out via the switch 260. The switch 260 may be configured by for example a cross bus switch.

The shared memory 220 and the cache memory 230 are memories that are shared by the channel controllers 210 and the disk controllers 240. The shared memory 220 is mainly used for storing the control information and commands, while the cache memory 230 is used mainly for storing data. Further, the cache memory 230 stores the user management information and so forth, and the details thereof are described later.

For example, when a data I/O request received by a certain channel controller 210 from the information processors 400 and 450 of the host machine is a write command, the concerned channel controller 210 writes the write command into the shared memory 220 and also writes the write data received from the information processors 400 and 450 of the host machine to the cache memory 230. On the other hand, the disk controller 240 monitors the shared memory 220, and when it detects that a write command has been written into the shared memory 220, the disk controller 240 reads the write data from the cache memory 230 according to the command and writes the write data into the disk drives 310 in the disk driver 300.

In addition, when a data I/O request received by a certain channel controller 210 from the information processors 400 and 450 of the host machine is a read command, the channel controller checks whether there is the data to be a read objective in the cache memory 230 or not. Here, if there is the data in the cache memory 230, the channel controller 210 sends the data to the information processors 400 and 450 of the host machine. On the other hand, if there is not data to be a read objective in the cache memory 230, the concerned channel controller 210 writes the read command into the shared memory 220 and monitors the shared memory 220. The disk controller 240 that has detected that the read command has been written into the shared memory 220 reads out the data to be a read objective from the disk drives 310 in the disk driver 300 and writes the data into the cache memory 230, and also, writes that effect into the shared memory 220. Also, when the channel controller 210 detects that the data to be a read objective has been written into the cache memory 230, the channel controller 210 sends the data to the information processors 400 and 450 of the host machine.

As mentioned above, data is sent and received via the cache memory 230 between the channel controllers 210 and the disk controllers 240. In addition, of the data stored in the disk drive 310, only the data to be read and written by the channel controllers 210 and the disk controllers 240 is stored into the cache memory 230.

Note that, beside the configuration in which the commands of data write and read from the channel controllers 210 to the disk controllers 240 are carried out indirectly with interposing the shared memory 220, for example, another configuration in which instructions of data write and read from the channel controllers 210 to the disk controllers 240 are carried out directly without interposing the shared memory 220 is also available. Also, by adding the function of the disk controller 240 to the channel controllers 210, channel controllers may be configured as the data I/O control units.

The disk controllers 240 are connected for communication with plural disk drives 310 that stores the data and control the disk driver 300. For example, as mentioned above, the channel controllers 210 carry out the data read and write to the disk drive 310 according to the data I/O request received from the information processors 400 of the host machine.

Each of the disk controllers 240 is connected with one another together with the service processor 250 via an internal LAN 261 and can communicate with one another. By so doing, micro programs and the like that are run by the disk controllers 240 can be sent from the service processor 250 and installed thereinto.

In this embodiment, the case where the shared memory 220 and the cache memory 230 are arranged independently of the channel controllers 210 and the disk controllers 240 has been described. However, the present invention is not limited to this and it is preferable that the shared memory 220 or the cache memory 230 is arranged in a distributed manner to each of the channel controllers 210 and the disk controllers 240. In this case, the switch 260 mutually connects the channel controllers 210 and the disk controllers 240 having the distributed shared memory 220 or cache memory 230.

Also, at least any of the channel controllers 210, the disk controllers 240, the switch 260, the shared memory 220, and the cache memory 230 may be configured integrally.

The service processor 250 is a computer for maintaining and managing the disk array system 100. An operator, by operating the service processor 250, can carry out for example the settings of the configuration of the disk drives 310 in the disk driver 300, settings of the communication paths among the information processors 400 and 450 of the host machine, the information processors 500 of the management client and the channel controllers 210, settings of logic volume, installation of micro programs run by the channel controllers 210 and the disk controllers 240 and so forth. Here, as the settings of the configuration of the disk drives 310 in the disk driver 300, there may be addition and reduction of the disk drives 310, changes of RAID configuration (change from RAID1 into RAID5 and the like) and so forth.

Further, the confirmation of operational state and determination of the faulty portion of the disk array system 100, installation of the operation system run by the channel controllers 210, and so forth can be carried out from the service processor 250. These settings and controls can be performed by an operator from a user interface provided in the service processor 250 or a user interface of the information processors 500 of the management client that displays web pages provided by a web server that works in the service processor 250. Operators may carry out the settings of the objectives and contents for the failure monitoring, settings of failure notification destination, and so forth by operating the service processor 250.

The service processor 250 may be built in the disk controller 200 or may be arranged externally. Also, the service processor 250 may be a computer exclusive for maintaining and managing the disk controller 200 and the disk driver 300 or may be a general-purpose computer having the maintenance and control functions.

In-Band/Out-of-Band Configuration of Storage System

Figure 2:
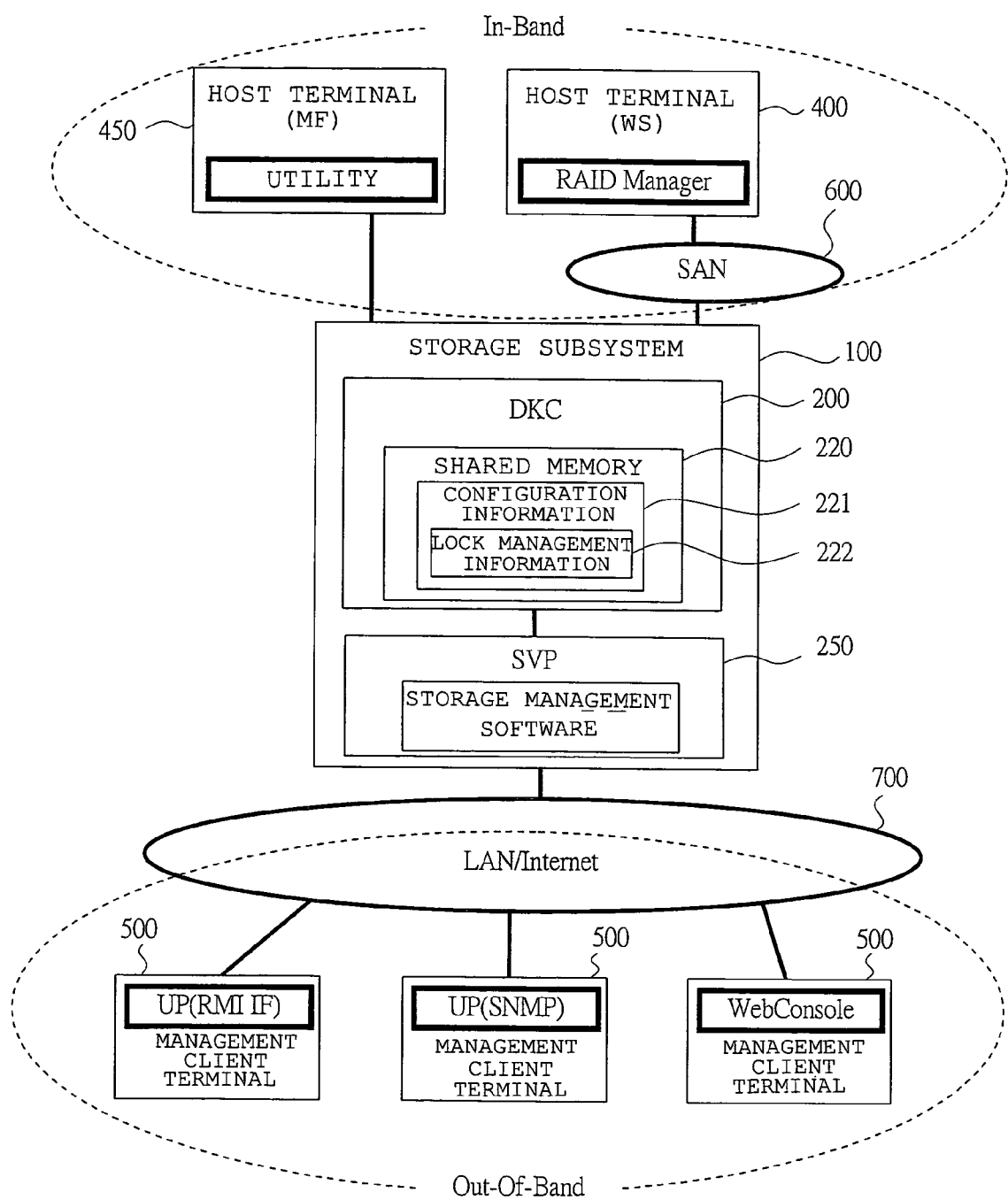
FIG. 2 is a schematic diagram showing a configuration of In-Band and Out-of-Band in a storage system according to an embodiment of the present invention.

An example of In-Band/Out-of-Band configuration in the storage system according to this embodiment will be described with reference to FIG. 2. FIG. 2 is a schematic diagram showing a configuration of In-Band and Out-of-Band in the storage system according to this embodiment.

The entire configuration and functions of the components in the storage system according to this embodiment are equivalent to those described above with reference to FIG. 1, while the major configuration of this embodiment is featured by a storage subsystem (=disk array system) 100, host terminals (=information processors of the host machine) 400 and 450 that perform the management control to the storage subsystem according to the In-Band method using a storage interface; and management client terminals (=information processors of the management client) 500 that perform the management control according to the Out-of-Band method using another interface physically and logically different from the storage interface.

The host terminal 400 is connected via the SAN 600 to the storage subsystem 100 and is for example a workstation (WS), and is provided with a RAID Manager as the terminal software program thereof. The host terminal 450 is connected to the storage subsystem 100 directly without any network and is for example a mainframe computer (MF), and is provided with utilities as the terminal software programs thereof. The management client terminals 500 are connected via a LAN (including the internet) 700 to the storage subsystem 100 and are provided with WebConsole and user program (UP) as the terminal software programs thereof. This UP includes interfaces such as RMI (Remote Method Invocation), SNMP (Simple Network Message Protocol) and so forth.

The major configuration of the storage subsystem 100 comprises: a disk controller (DKC) 200 provided with a shared memory 220 including a configuration information 221 having a lock management information 222 described later; and a service processor (SVP) 250 provided with storage management software. In FIG. 2, the SVP 250 is externally attached to the DKC 200, and the DKC 200 and the SVP 250 are connected with each other via a LAN.

In the In-Band/Out-of-Band configuration of the storage system configured as described above, the storage subsystem 100 has the lock management information 222 in the shared memory 220 in the DKC 200, and an identifier of a terminal (user) having the operation authority and information such as the acquisition time of operation authority and the remaining time to the limit are stored in this lock management information 222. This lock management information 222 is used in common in both the channels of In-Band and Out-of-Band. Therefore, uniform management of the operation authority acquisition request processes from plural channels is realized. In addition, the operation authority acquisition function, the remaining time acquisition function, and the time extension function are prepared for each channel, and also, a function to uniformly manage the information (operation authority/remaining time) and functions between channels and users are held as a storage control function in the storage subsystem 100.

In other words, in the In-Band/Out-of-Band configuration of the storage system according to this embodiment, the number of terminal (user) having the operation authority is limited to one. In this case, the remaining time to the limit of a user having the operation authority is displayed on a screen to show it to the user, and when all the configuration change operations are not completed within the time limit, the time limit may be extended. Furthermore, the function to display the remaining time of the user having the operation authority is provided to other users not having the operation authority, and when the user having the operation authority leaves the terminal and if the remaining time limit expires, the operation authority is expired, and before the expiration of the remaining time, a third party (administrator) may cancel the operation authority. These functions are explained in detail hereinafter.

Storage Management

In the storage subsystem 100 shown in FIG. 2, the storage management software manages the user login and the operation authority from terminal software programs (utilities/RAID Manager/Web Console/UP) of the host terminals 400 and 450 and the management client terminals 500. By this storage management software, there exit plural terminals (users) that carry out the storage management, and they use In-Band and Out-of-Band, and various protocols.

For example, in the In-Band, the terminal software programs of the host terminals 400 and 450 use the same channel as that used in the data read/write from the host terminals 400 and 450 to the storage subsystem 100 (Fibre/ESCON/FICON, etc.) and carries out the management (view and change/update process of the configuration information 221) of the storage subsystem 100. On the other hand, in the Out-of-Band, the terminal software program of the management client terminal 500 carries out the management (view and change/update process of the configuration information 221) to the storage subsystem 100 via the LAN.

In the configuration mentioned above, the lock management information 222 showing which terminal (user) has the authority to change (edit) the configuration information 221 now is uniformly managed in the shared memory 220 on the DKC 200 side. For example, the storage management software receives an operation authority acquisition request from the management client terminal (user) 500 that logs in from Out-of-Band and updates the operation authority information of the DKC 200. Further, the storage management software executes (provides) the process (service) to the configuration information change request from the management client terminal 500 and updates (changes) the configuration information 221. On the other hand, with respect to the configuration information change request from the host terminals (users) 400 and 450 that logs in from the In-Band, the micro program on the DKC 200 side directly updates (changes) the configuration information 221 that is stored in the DKC 200.

Operation Authority of Configuration Information

Figure 3:
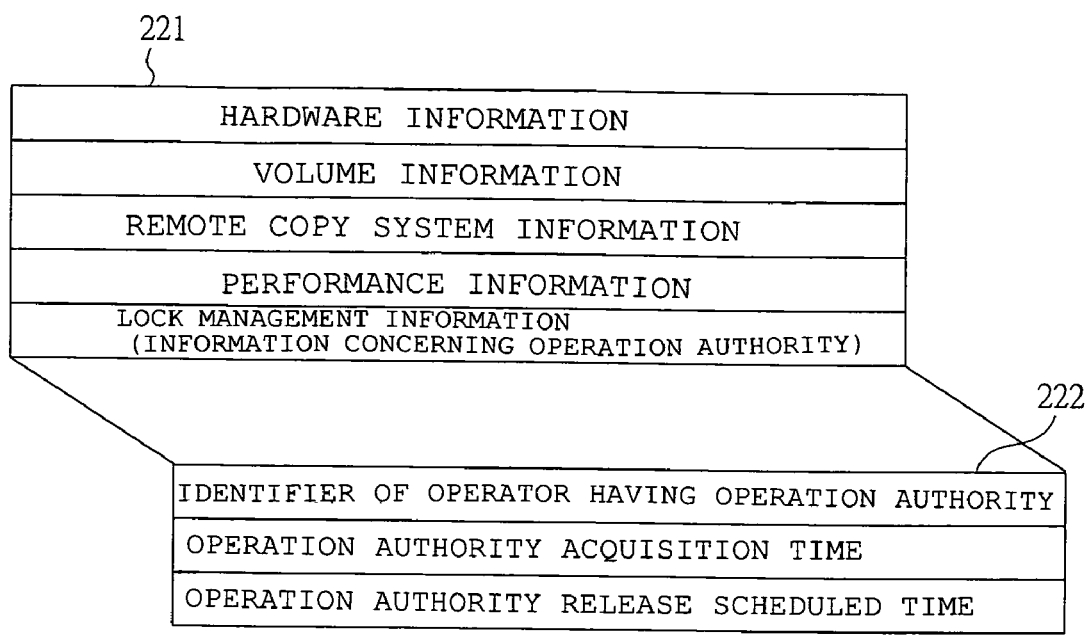
FIG. 3 is a schematic diagram showing configuration information including lock management information in a storage system according to an embodiment of the present invention.

An example of the configuration information including the lock management information stored in the DKC will be described with reference to FIG. 3. FIG. 3 is a schematic diagram showing the configuration information including the lock management information.

There are two kinds of users, i.e., the administrator and the general user. The administrator is a user who has the authority to carry out all the settings of the storage management software and can register/delete the general users and perform other control functions. On the other hand, the general user is a user who can carry out only the operations permitted by the administrator.

Also, there are two kinds of the operation authority to the configuration information 221, i.e., the modify mode and the view mode. The modify mode is a mode in which the configuration information 221 can be changed. On the other hand, the view mode is a mode in which only the viewing of the configuration information 221 is permitted.

This configuration information 221 concerning this operation authority is stored in the DKC 200 (in concrete, in the shared memory 220), and the information controlled by the configuration information 221 in this DKC 200 includes the lock management information 222 and further (1) hardware information, (2) volume information, (3) remote copy system information, (4) performance information, and (5) lock management information (information concerning the operation authority) as shown in FIG. 3.

Respectively, (1) the hardware information is the information about the type of the disk drives 310 and the type of the package and so forth, (2) the volume information is the information concerning the logic volume defined in the storage subsystem 100 (capacity/management number (logic device (LDEV) number, and the like), (3) the remote copy system information is the information created by using functions of the storage subsystem 100 such as the remote copy (paired volume information, pair condition, and the like), (4) the performance information is the statistic value concerning R/W performance from the host terminals 400 and 450, and (5) the lock management information (information concerning the operation authority) is the information concerning the operation authority, for example, an identifier of the operator having the operation authority, acquisition time of the operation authority, the release scheduled time of the operation authority, and the like.

Each of these information items are managed in the configuration information 221 in the DKC 200, and especially by using the function based on the lock management information (information concerning the operation authority) 222 shown in (5), the information is changed (updated).

Control Function of Operation Authority

The functions (services) for managing the operation authority based on the lock management information (information concerning the operation authority) 222 shown in (5) include (a) operation authority (modify) acquisition function, (b) operation authority (modify) release function, (c) operation authority (modify) extension function, (d) operation authority (modify) forced release function, (e) remaining time acquisition function, (f) acquisition function of operator identifier having operation authority (modify), and so forth.

The operation authority (modify) acquisition function in (a) is the function to request the acquisition of the operation authority for the configuration information 221 from the terminal software program to the storage management software. For example, when the storage management software receives (permits) this function, the change/update process function (service) of the configuration information 221 in the DKC 200 becomes available.

The operation authority (modify) release function in (b) is a function to request the release of the operation authority for the configuration information 221 from the terminal software program to the storage management software. For example, when the storage management software receives this function, the change/update process function (service) of the configuration information 221 in the DKC 200 from the terminal software program becomes unavailable. However, the configuration information 221 in the DKC 200 can be viewed.

The operation authority (modify) extension function in (c) is a function to extend the time limit when the remaining time is reduced. Further, this function is a function executed by only an operator having the modify mode authority.

The operation authority (modify) forced release function in (d) is a function (i) to forcibly release the modify mode authority of an operator having the modify mode authority by the storage management software when time limit expires (TimeOver). For example, when an operator having the modify mode authority leaves his/her own terminal and the remaining time thereof expires, the operation authority also expires. Furthermore, this function is also a function (ii) to forcibly take away the operation authority (modify) from the terminal (user) having the operation authority (modify) by a third party (administrator). For example, before the remaining time expires, the third party (administrator) may cancel the operation authority.

The remaining time limit acquisition function in (e) is a function to acquire the information of the remaining time of an operator having the operation authority (modify). For example, this function is used so as to display the remaining time of an operator having the operation authority on an operation screen or to display how long the other operators not having the operation authority must wait on an operation screen.

The acquisition function of the operator identifier having the operation authority in (f) is a function to acquire the identifier of the operator having the operation authority. Further, this function also enables to acquire the time when the operation authority has been acquired.

The storage management software mounts the above six functions both from the In-Band and from the Out-of-Band and provides the services to the terminal software programs on the host terminals 400 and 450 and the management client terminals 500. In this case, the storage management software sends an (error) code to the terminal software programs to show whether each function (service) has been succeeded or failed.

Changes of Configuration Information from Plural Channels

Figure 4:
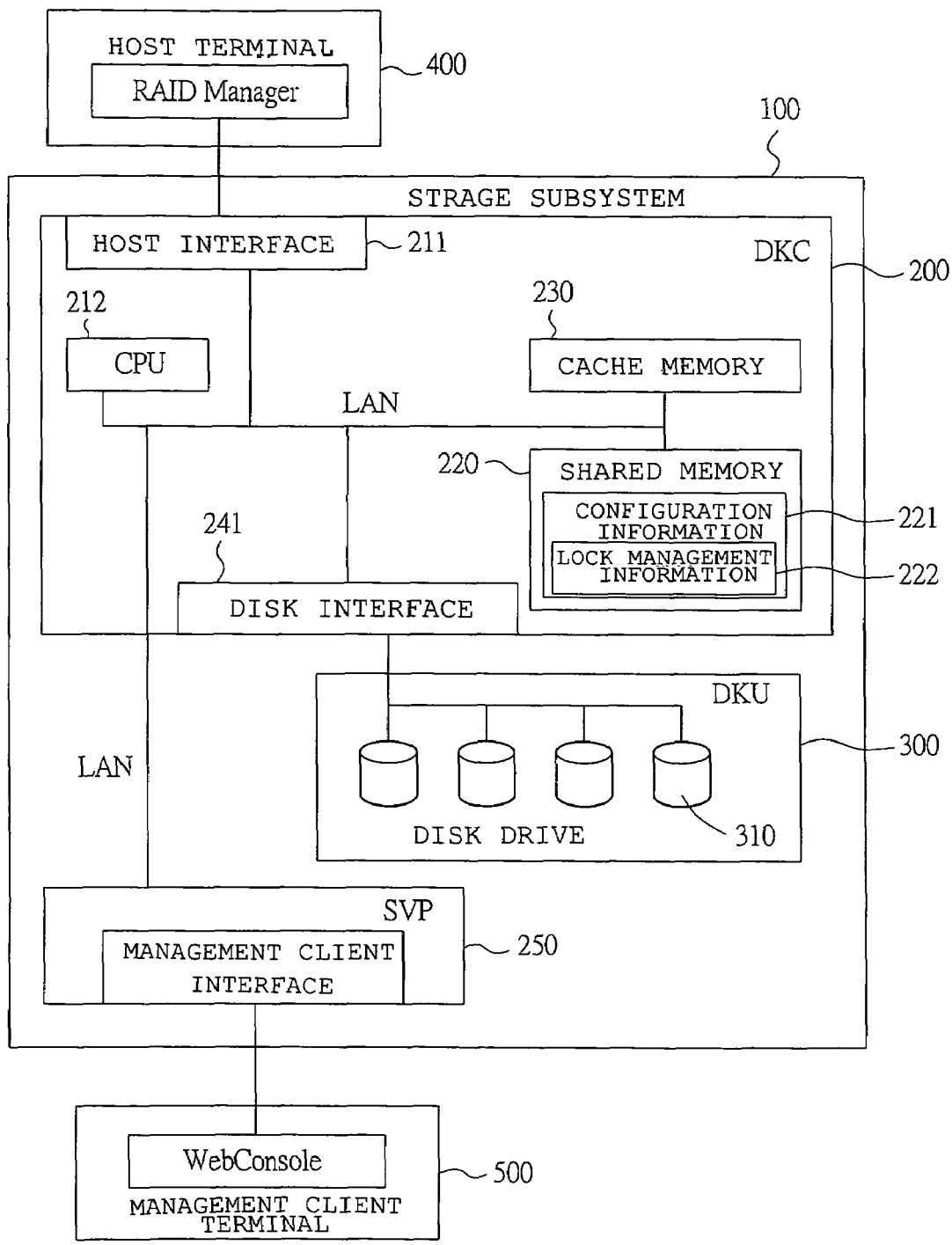
FIG. 4 is a schematic diagram showing a major configuration of a storage subsystem in a storage system according to an embodiment of the present invention.

An example of the major configuration of the storage subsystem will be described with reference to FIG. 4. FIG. 4 is a schematic diagram showing a major configuration of the storage subsystem.

Changes of the configuration information 221 from plural channels (In-Band and Out-of-Band) are executed in the major configuration of the storage subsystem shown in FIG. 4 (the entire configuration thereof has been described in detail in FIG. 1). Namely, one end of the DKC 200 of the storage subsystem 100 is connected to the host terminals 400 and 450 (FIG. 4 shows the case of the host terminal (RAID Manager) 400) and the other end thereof is connected to the SVP 250, and further, the SVP 250 is connected to the management client terminal 500.

This DKC 200 is provided with a host interface 211 and a CPU 212 included in the channel controller 210, the shared memory 220, the cache memory 230, a disk interface 241 included in the disk controller 240, and so forth. Many disk drives 310 in the disk driver (DKU) 300 are connected to the disk interface 241.

The host interface 211 is the portion to control the interface with the host terminal 400 and can cope with a block storage access for management control by the storage and the In-Band. Also, the SVP 250 serves as the interface with the management client terminal 500 and can cope with a network access for management control by the Out-of-Band. The CPU 212 is the portion to manage and control the DKC 200 and the DKU 300 and carries out the control appropriate to the accesses from both the In-Band using the host interface 211 and the Out-of-Band using the SVP 250. In the shared memory 220, the configuration information 221 including an identifier of the operator having the operation authority, the acquisition time of the operation authority, the release scheduled time of the operation authority, and the like which are the lock management information (information concerning the operation authority) 222 in (5) is stored.

Change Operation of Configuration Information from In-Band

Figure 5:
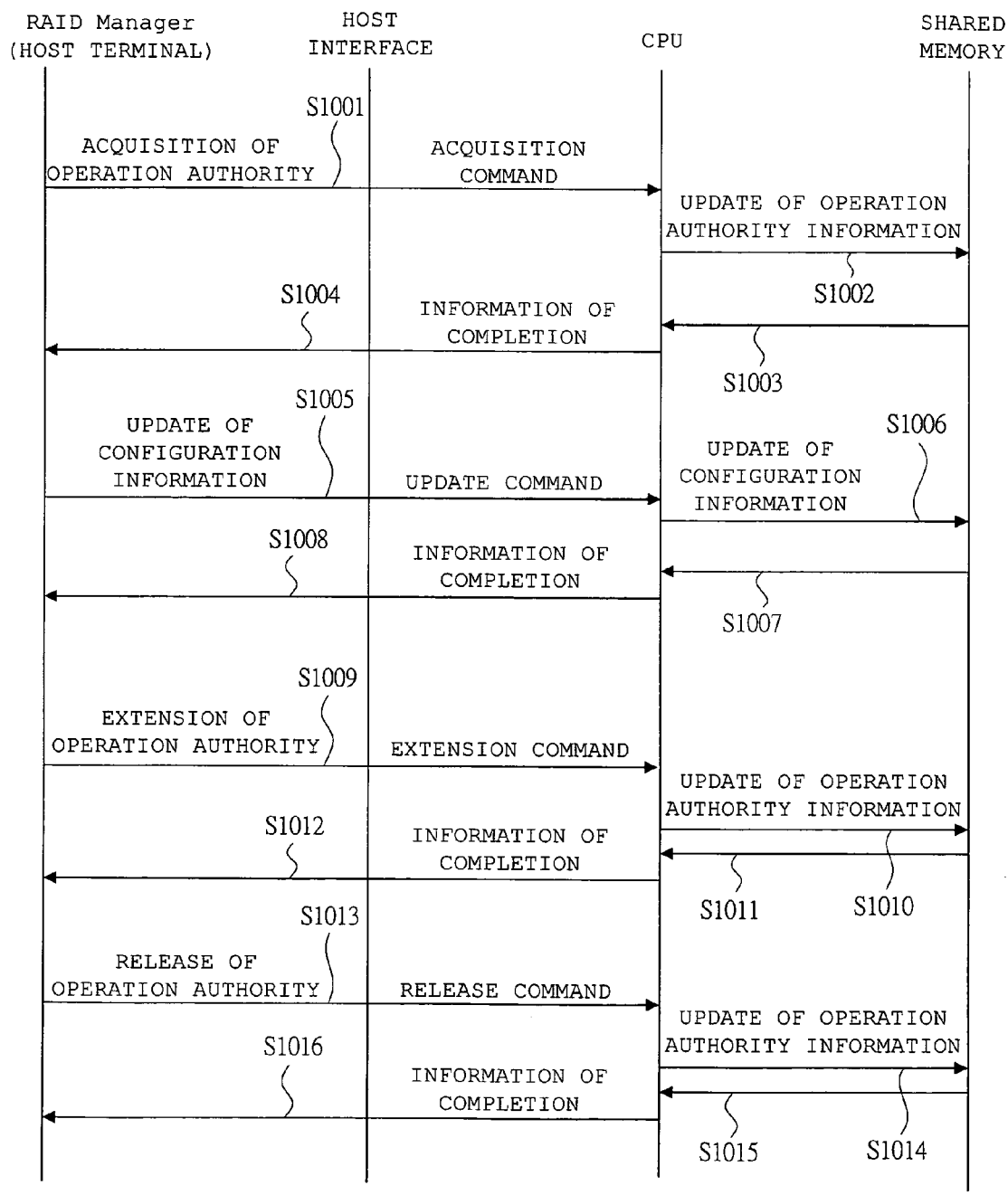
FIG. 5 is a schematic diagram showing the sequence of the operation to change the configuration information from In-Band in a storage system according to an embodiment of the present invention.

An example of the operation to change the configuration information from the In-Band will be described with reference to FIG. 5. FIG. 5 is a schematic diagram showing the sequence of the change operation of configuration information from the In-Band.

In the major configuration of the storage subsystem 100 as shown in FIG. 4 mentioned above, the change operation of the configuration information 221 from the In-Band (for example RAID Manager) is carried out among the RAID Manager of the host terminal 400, the host interface 211 in the DKC 200 of the storage subsystem 100, the CPU 212, and the shared memory 220 as shown in FIG. 5. The sequence of the operation authority acquisition/release at the time when changing this configuration information 221 is made in the following procedures.

When changing the configuration information 221, the host terminal (user) 400 uses the RAID Manager to issue the operation authority acquisition command in S1001. This operation authority acquisition command is transmitted via the host interface 211 to the CPU 212. Further, according to the requested process (operation authority acquisition in this case), the CPU 212 determines what process should be made to which module thereafter and requests the process in S1002. In this case, an update of the operation authority information is carried out to the shared memory 220. In concrete, concerning the lock management information 222, (a) setting of an identifier of the operator having the operation authority, (b) setting of the acquisition time of the operation authority, and (c) setting of the release scheduled time of the operation authority are performed. At this moment, if the operation authority has been already acquired by other channel/terminal (user), "(a) operation authority acquisition" ends as an error, and the operation authority cannot be acquired. Then, when the update of the operation authority information to the shared memory 220 is completed, the CPU 212 informs the RAID Manager of the process completion in S1003 and S1004. By so doing, the user of the RAID Manager acquires the operation authority.

Thereafter, necessary update process of the configuration information 221 is performed. Since this configuration information 221 is stored in the shared memory 220, the update process is performed in the above sequence. More specifically, the host terminal (user) 400 uses the RAID Manager to issue an update command of the configuration information 221 in S1005. This update command of the configuration information 221 is transmitted via the host interface 211 to the CPU 212. Further, according to the update of the configuration information 221, the CPU 212 updates the configuration information 221 in the shared memory 220 in S1006. Then, when the update of the configuration information 221 in the shared memory 220 is completed, the CPU 212 informs the RAID Manager of the process completion in S1007 and S1008.

At this moment, if the update process of the configuration information 221 is not completed within a specified time, the operation authority time can be extended. Also in this case, the host terminal (user) 400 uses the RAID Manager to issue an operation authority time extension request in S1009. This operation authority time extension command is transmitted via the host interface 211 to the CPU 212. Further, the CPU 212 changes (c) the setting of the operation authority release scheduled time in the shared memory 220 in S1010. Then, when the change of (c) the setting of the operation authority release scheduled time in the shared memory 220 is completed, the CPU 212 informs the RAID Manager of the process completion in S1011 and S1012.

Further, when the update process of the configuration information 221 is completed, the host terminal (user) 400 uses the RAID Manager to issue an operation authority release command in S1013. This operation authority release command is transmitted via the host interface 211 to the CPU 212. Further, the CPU 212 clears the operation authority information in the shared memory 220 in S1014. In concrete, it carries out (a) deletion of the identifier of the operator having the operation authority, (b) initialization of the operation authority acquisition time, and (c) initialization of the operation authority release scheduled time. Then, when the clearance of the operation authority information in the shared memory 220 is completed, the CPU 212 informs the RAID Manager of the process completion in S1015 and S1016. By so doing, the user of the RAID Manager releases the operation authority.

Read/Write Process from In-Band

Figure 6:
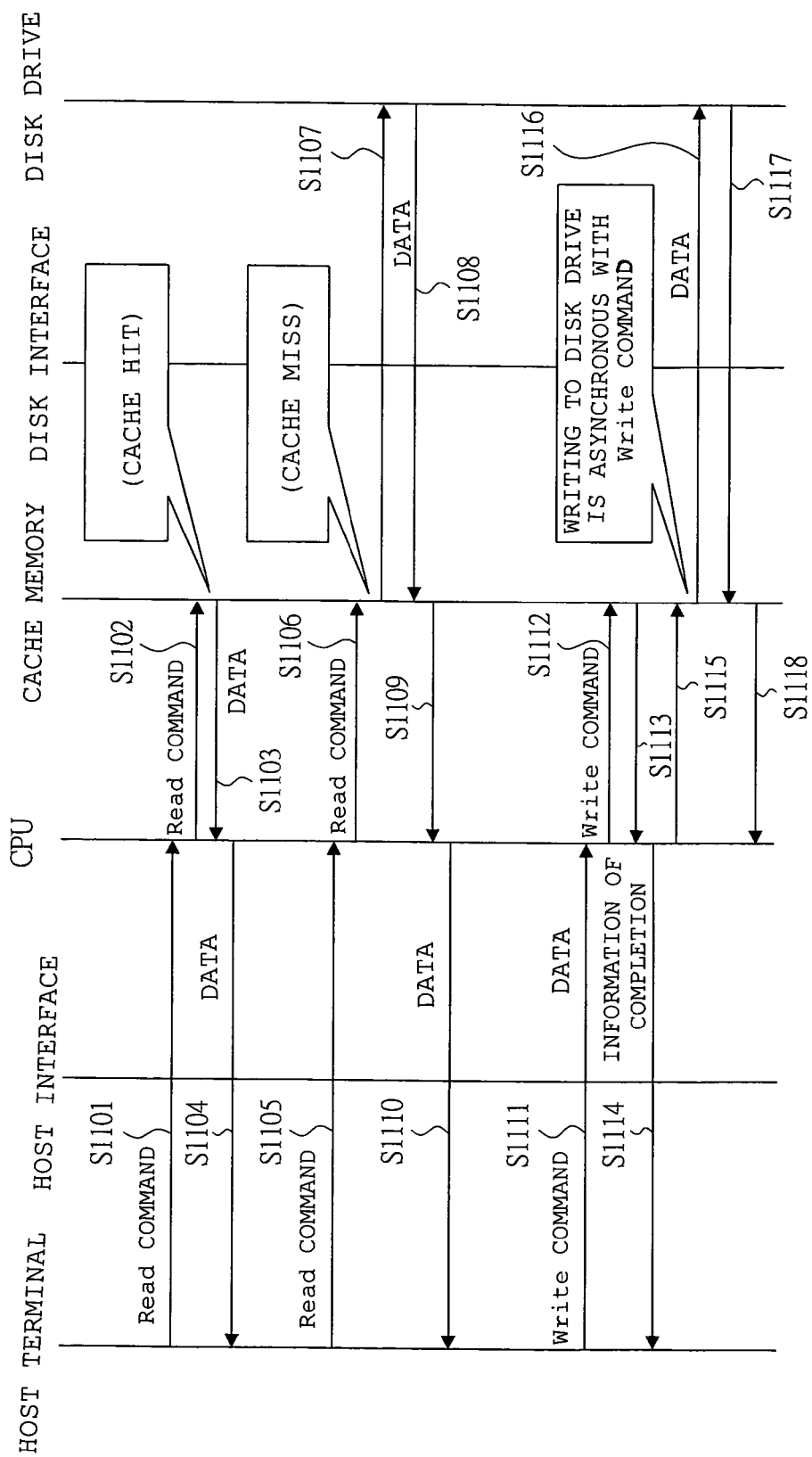
FIG. 6 is a schematic diagram showing the sequence of read/write process from In-Band in a storage system according to an embodiment of the present invention.

An example of the read/write process from the In-Band will be described with reference to FIG. 6. FIG. 6 is a schematic diagram showing the sequence of the read/write process from the In-Band.

In the case of a read process from the In-Band (the case of the host terminal 400) to the disk drives 310, the read command from the host terminal 400 is transmitted via the host interface 211 to the CPU 212 in S1101. Also, the CPU 212 receives the read command and determines whether there is the data in the cache memory 230 or not in S1102, and when there is the data in the cache memory 230 (the case of cache hit), the CPU reads out the data from the cache memory 230 and transfers the data to the host terminal 400 in S1103 and S1104.

On the other hand, in the case of the read process (S1105 and S1106 are the same as S1101 and S1102), when there is no data in the cache memory 230 (the case of cache miss), the CPU reads out the data from the disk drives 310 via the disk interface 241 in S1107 and S1108 and stores the data into the cache memory 230. Thereafter, the CPU transfers the data to the host terminal 400 in S1109 and S1110.

Also, in the case of the write process from the In-Band (the case of the host terminal 400) to the disk drives 310, the write command from the host terminal 400 is transmitted via the host interface 211 to the CPU 212 in S1111, and the CPU 212 stores the data once into the cache memory 230 in S1112 and informs the host terminal 400 of the write process completion in S1113 and S1114. Thereafter, the CPU 212 reads out the data stored into the cache memory 230 and writes the data via the disk interface 241 into the disk drives 310 in S1115 to S1118. This write process into the disk drives 310 is carried out in an asynchronous manner with the write command.

Change Operation of Configuration Information from Out-of-Band

Figure 7:
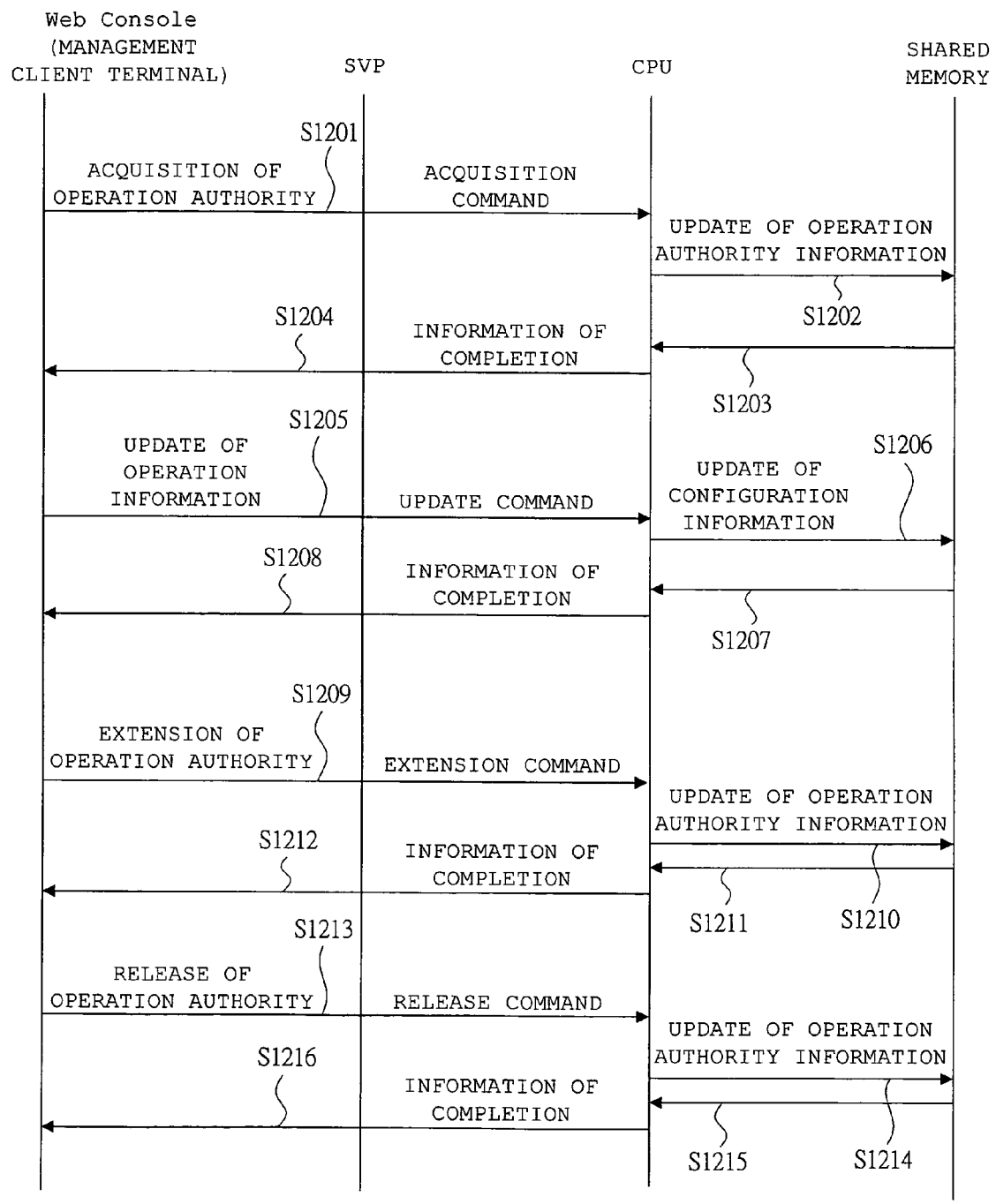
FIG. 7 is a schematic diagram showing the sequence of the operation to change the configuration information from Out-of-Band in a storage system according to an embodiment of the present invention.

An example of the operation to change the configuration information from the Out-of-Band will be described with reference to FIG. 7. FIG. 7 is a schematic diagram showing the sequence of the change operation of the configuration information from the Out-of-Band.

In the major configuration of the storage subsystem 100 as shown in FIG. 4 mentioned above, the change operation of the configuration information 221 from the Out-of-Band (for example WebConsole) is carried out among the WebConsole of the management client terminal 500, the SVP 250 of the storage subsystem 100, the CPU 212 in the DKC 200, and the shared memory 220 as shown in FIG. 7. The sequence of the operation authority acquisition/release at the time when changing this configuration information 221 is made in the following procedures.

When changing the configuration information 221, the management client terminal (user) 500 uses the WebConsole to issue an operation authority acquisition command in S1201. This operation authority acquisition command is transmitted via the SVP 250 to the CPU 212. Further, according to the requested process (operation authority acquisition in this case), the CPU 212 determines what process should be requested to which module thereafter and requests the process in S1202. In this case, an update of the operation authority information is carried out to the shared memory 220. In concrete, concerning the lock management information 222, (a) setting of an identifier of the operator having the operation authority, (b) setting of the acquisition time of the operation authority, and (c) setting of the release scheduled time of the operation authority are performed. At this moment, if the operation authority has been already acquired in other channel/terminal (user), the operation authority acquisition ends as an error, and the operation authority cannot be acquired. Then, when the update of the operation authority information to the shared memory 220 is completed, the CPU 212 informs the WebConsole of the process completion. By so doing, the user of the WebConsole acquires the operation authority.

Thereafter, necessary update process of the configuration information 221 is performed. Since this configuration information 221 is stored in the shared memory 220, the update process is performed in the above sequence. More specifically, the management client terminal (user) 500 uses the WebConsole to issue an update command of the configuration information 221 in S1205. This update command of the configuration information 221 is transmitted via the SVP 250 to the CPU 212. Further, according to the update of the configuration information 221, the CPU 212 updates the configuration information 221 in the shared memory 220 in S1206. Then, when the update of the configuration information 221 in the shared memory 220 is completed, the CPU 212 informs the WebConsole of the process completion in S1207 and S1208.

At this moment, if the update process of the configuration information 221 is not completed within a specified time, the operation authority time can be extended. Also in this case, the management client terminal (user) 500 uses the Web-Console to issue an operation authority time extension request in S1209. This operation authority time extension command is transmitted via the SVP 250 to the CPU 212. Further, the CPU 212 changes (c) the setting of the operation authority release scheduled time in the shared memory 220 in S1210. Then, when the change of (c) the setting of the operation authority release scheduled time in the shared memory 220 is completed, the CPU 212 informs the Web-Console of the process completion in S1211 and S1212.

Further, when the update process of the configuration information 221 is completed, the management client terminal (user) 500 uses the WebConsole to issue an operation authority release command in S1213. This operation authority release command is transmitted via the SVP 250 to the CPU 212. Further, the CPU 212 clears the operation authority information in the shared memory 220 in S1214. In concrete, it carries out (a) deletion of the identifier of the operator having the operation authority, (b) initialization of the operation authority acquisition time, and (c) initialization of the operation authority release scheduled time. Then, when the clearance of the operation authority information in the shared memory 220 is completed, the CPU 212 informs the WebConsole of the process completion in S1215 and S1216. By so doing, the user of the WebConsole releases the operation authority.

Management of Time to Hold the Operation Authority of In-Band/Out-of-Band

An example of the lock management information stored in the configuration information will be described with reference to FIG. 8 and FIG. 9. FIG. 8 is a schematic diagram showing the lock management information defined in common to the respective terminals and FIG. 9 is a schematic diagram showing the lock management information defined to each of the terminals.

The operation authority holding time includes the initial operation authority holding time and the additional time in the extension process. There are two kinds of the management methods of this operation authority holding time, i.e., for each terminal of the host terminals 400 and 450 of the In-Band and the management client terminals 500 of the Out-of-Band, (1) the case where the holding time is determined uniformly in the system (all the terminals (users)) and the holding time is managed in common and (2) the case where the holding time is defined in each of the terminals (users).

In the case (1) where the holding time is determined uniformly in the system (all the terminals (users)) and the holding time is managed in common, as shown in FIG. 8, the initial operation authority holding time and the amount of the additional time in the extension process are defined as the common information of the lock management information (information concerning the operation authority) 222a stored in the configuration information 221 in the DKC 200 (in concrete, in the shared memory 220).

In the case of this time management, when building the system configuration, the initial operation authority holding time and the amount of the additional time in the extension process are set as the common information concerning the operation authority, and when the operation authority acquisition/extension instruction is received, the operation authority release scheduled time is determined by using this information (value). In concrete, the operation authority release scheduled time is determined by adding the initial operation authority holding time to the operation authority acquisition time, and when the time extension request is received, the additional time in the extension process is added to determine the new operation authority release scheduled time in the extension process.

In the case (2) where the holding time is defined in each of the terminals (users), as shown in FIG. 9, the initial operation authority holding time and the amount of the additional time in the extension process are defined in each of the terminals (users) as the lock management information (information concerning the operation authority) 222b stored in the configuration information 221 in the DKC 200, and when the operation authority acquisition/extension instruction is received, the operation authority release scheduled time is determined by using this information (value). In concrete, for example, the user A determines the operation authority release scheduled time by adding the initial operation authority holding time to the operation authority acquisition time, and when the extension request is received, the user A determines the new operation authority release scheduled time in the extension process by adding the additional time in the extension process. The same is true in other users B, C, . . . .

In this case, it is necessary to define the holding time in each of the terminals (users), therefore, the function (service) to change the amount of the initial operation authority holding time and the additional time in the extension process must be provided to each terminal (user).

Calculation of the Operation Authority Holding Time of In-Band/Out-of-Band

As a method to calculate the operation authority holding time, there is the method in which the operation authority release scheduled time is recorded in the configuration information 221. As a precondition for this calculation method, the internal clock of the DKC 200 must coincide with that of the SVP 250. When a remaining time limit acquisition command is received from each terminal of the host terminals 400 and 450 of the In-Band and the management client terminals 500 of the Out-of-band, the remaining time limit is calculated based on the differences between the operation authority release scheduled time and the internal clocks of the DKC 200 and the SVP 250 and then the remaining time is sent back to the terminal (user).

Screen Display of Operation Authority Time Limit of Out-of-Band

Figure 10:
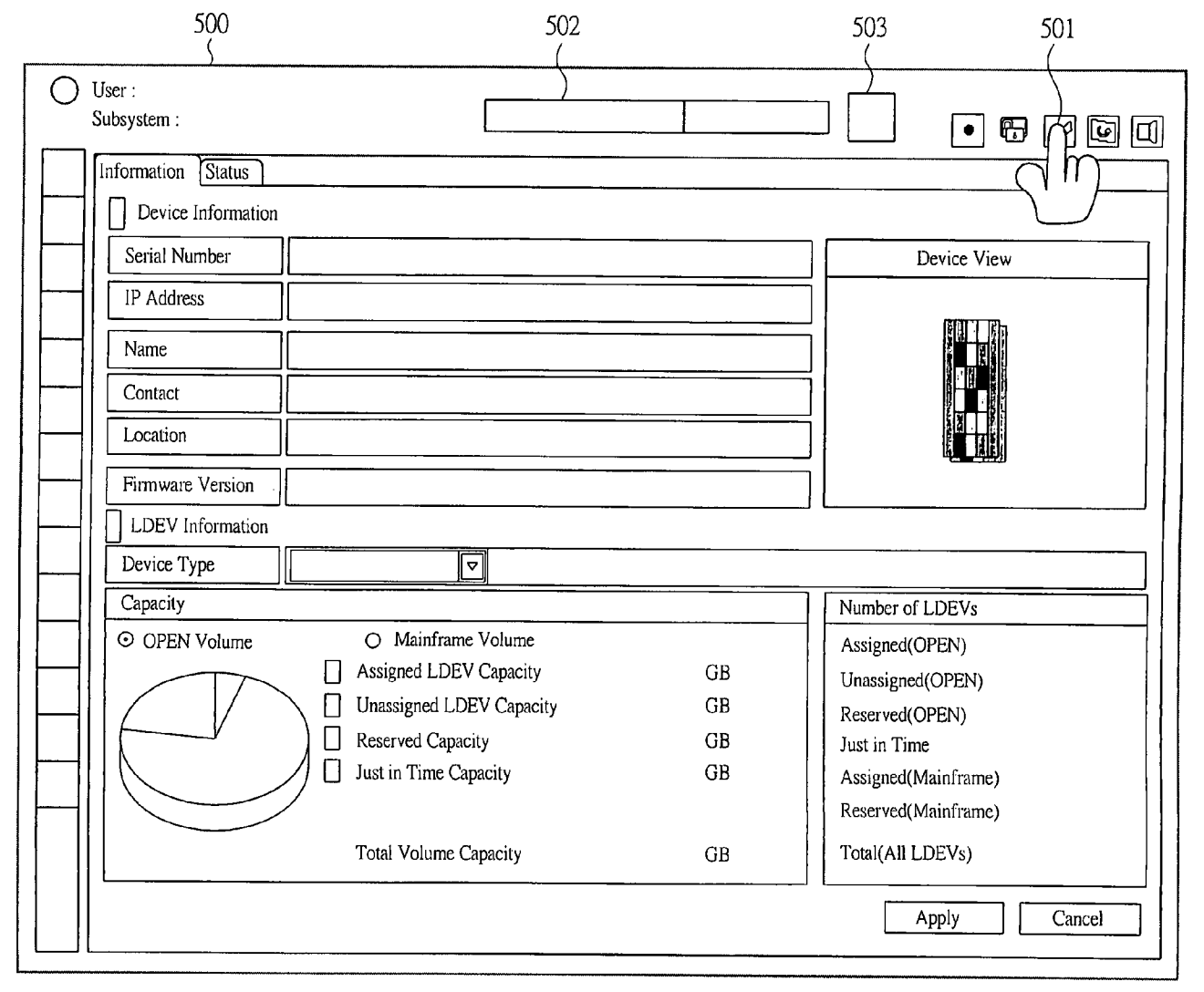
Figure 11:
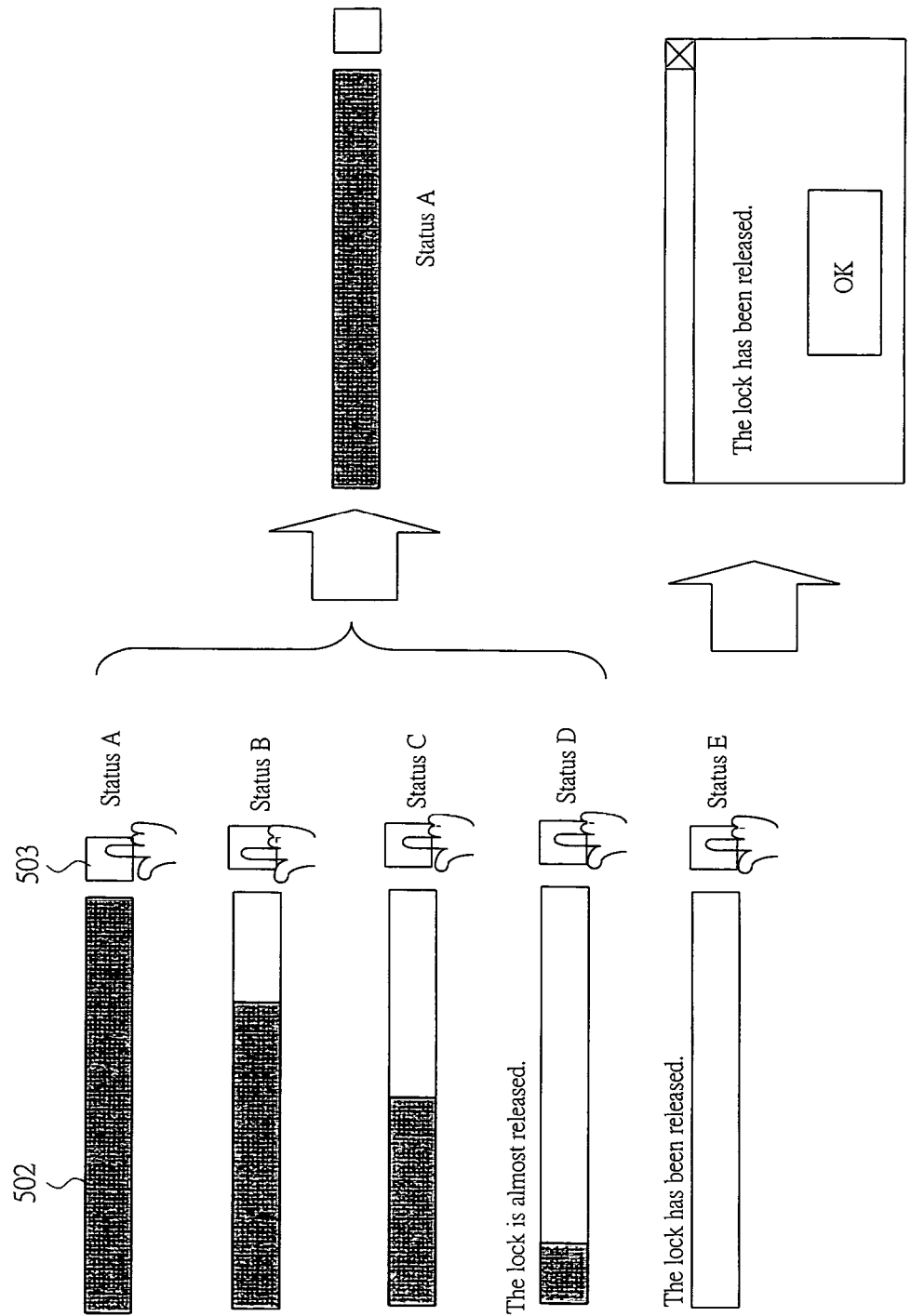
FIG. 11 is a schematic diagram showing the changes in an indicator in a storage system according to an embodiment of the present invention.

An example of the screen of the management client terminal will be described with reference to FIGS. 10 to 12. FIG. 10 is a schematic diagram showing the screen of the management client terminal, FIG. 11 is a schematic diagram showing changes in an indicator, and FIG. 12 is a schematic diagram showing character strings to be displayed on the indicator.

In the Out-of-Band, as shown in FIG. 10, the screen of an applet panel in the management client terminal (in the case of WebConsole) 500 of a user can display device information, LDEV information and so forth, in the information/status display screen. The device information includes the areas of Serial Number, IP Address, Name, Contact, Location, and Firmware Version and the like and the display area of Device View. The LDEV information includes the areas of Device Type, Capacity, Number of LDEVs and the like.

In such a display screen, in order to give a warning of the timeout of the modify lock to the user, an indicator 502 is displayed at the top portion of the applet panel. As shown in FIG. 11, this indicator 502 changes in respective statuses A, B, C, D, and E. In concrete, it appears as mentioned below. This indicator 502 is displayed by pressing an operation authority acquisition (modify mode) button 501 arranged at the top right of the applet panel.

The status A is the one in which the color of the indicator 502 is displayed in green, showing the status when the applet starts or when the lock extension button is pressed and the status until the next self-check method is called.

The status B is the one in which the color of the indicator 502 is displayed in green and the [remaining time]/[RMI Modify TimeOut time] is calculated and displayed so as to be equivalent to the green area. The remaining portion is white. This status B is the status in which [remaining time]/[RMI Modify TimeOut time]>50%.

The status C is the one in which the color of the indicator 502 is displayed in yellow and the [remaining time]/[RMI Modify TimeOut time] is calculated and displayed so as to be equivalent to the yellow area. The remaining portion is white. This status C is the status when [remaining time]/[RMI Modify TimeOut time]<50% and [remaining time]>5 minutes.

The status D is the one in which the color of the indicator 502 is displayed in red and the [remaining time]/[RMI Modify TimeOut time] is calculated and displayed so as to be equivalent to the red area. The remaining portion is white. This status D is the status when [remaining time]<5 minutes.

The status E is the one in which the color of the indicator 502 is displayed in white. This status E is the status at the moment when the modify lock is released (The lock has been released).

Also, in the respective statuses A, B, C, D, and E, character strings as shown in FIG. 12 may be displayed on the indicator 502. For example, in the statuses A, B, and C, "XX minutes until modify mode release" or "XX minutes until lock is released" is displayed respectively on the indicator 502. In the status D, "Modify mode will be released soon (in XX minutes)" or "The lock is almost released (Remaining time is XX minutes)" is displayed. In the status E, "Modify mode has been released" or "The lock has been released" is displayed. Note that, XX represents the remaining time (in unit of minute).

In addition, on the top portion of the applet panel, besides the indicator 502, an operation authority extension (modify timeout time extension) button 503 is arranged on the right side of this indicator 502. As shown in FIG. 11, this modify timeout time extension button gets in the status A when pressed in the status A/B/C/D, and an error message is displayed when pressed in the status E.

However, when the modify timeout time of RMI is infinite, the management client terminal 500 regards these functions as nonexistence and all of them are not displayed. Also, in the view-mode, these buttons and indicator are displayed in gray.

Screen Display of Operation Authority Time Limit of In-Band

An example of the screen of the host terminal will be described with reference to FIG. 13 and FIG. 14. FIG. 13 is a schematic diagram showing the relations between each of the operations at a host terminal and commands, while FIG. 14 is a schematic diagram showing the operation procedures at a host terminal.

In the In-Band, the operation from the host terminals 400 and 450 of users includes operation authority (modify) acquisition function, operation authority (modify) release function, operation authority (modify) extension function, operation authority (modify) forced release function, remaining time limit acquisition function, acquisition function of identifier of a user having the operation authority (modify) and so forth, and the command names as shown in FIG. 13 are allotted to the respective functions as command management information 223. This command management information 223 is stored in the shared memory 220 in the DKC 200.

At the time of the operation from the host terminals 400 and 450, the operation authority time limit display/time limit extension operation is carried out from each terminal in the procedures as shown in FIG. 14. In the operation authority acquisition operation, the operation authority acquisition (You get modify mode) becomes available by inputting Get modify User ID. In the operation authority remaining time acquisition operation, the operation authority remaining time acquisition (Your remain time is 15 minute) becomes available by inputting Get remain time User ID. In the operation authority extension instruction operation, the operation authority extension instruction (Your remain time is 30 minute) becomes available by inputting Extension time User ID after the operation authority remaining time is acquired. In the operation authority release operation, the operation authority release (You released modify mode) becomes available by inputting Free modify User ID. In the acquisition operation of an identifier of the operator having the operation authority (Modify), the acquisition of an identifier of the operator having the operation authority (modify) (Modify mode had user ID) becomes available by inputting Get modified user ID.

Another In-Band/Out-of-band Configuration of Storage System

Figure 15:
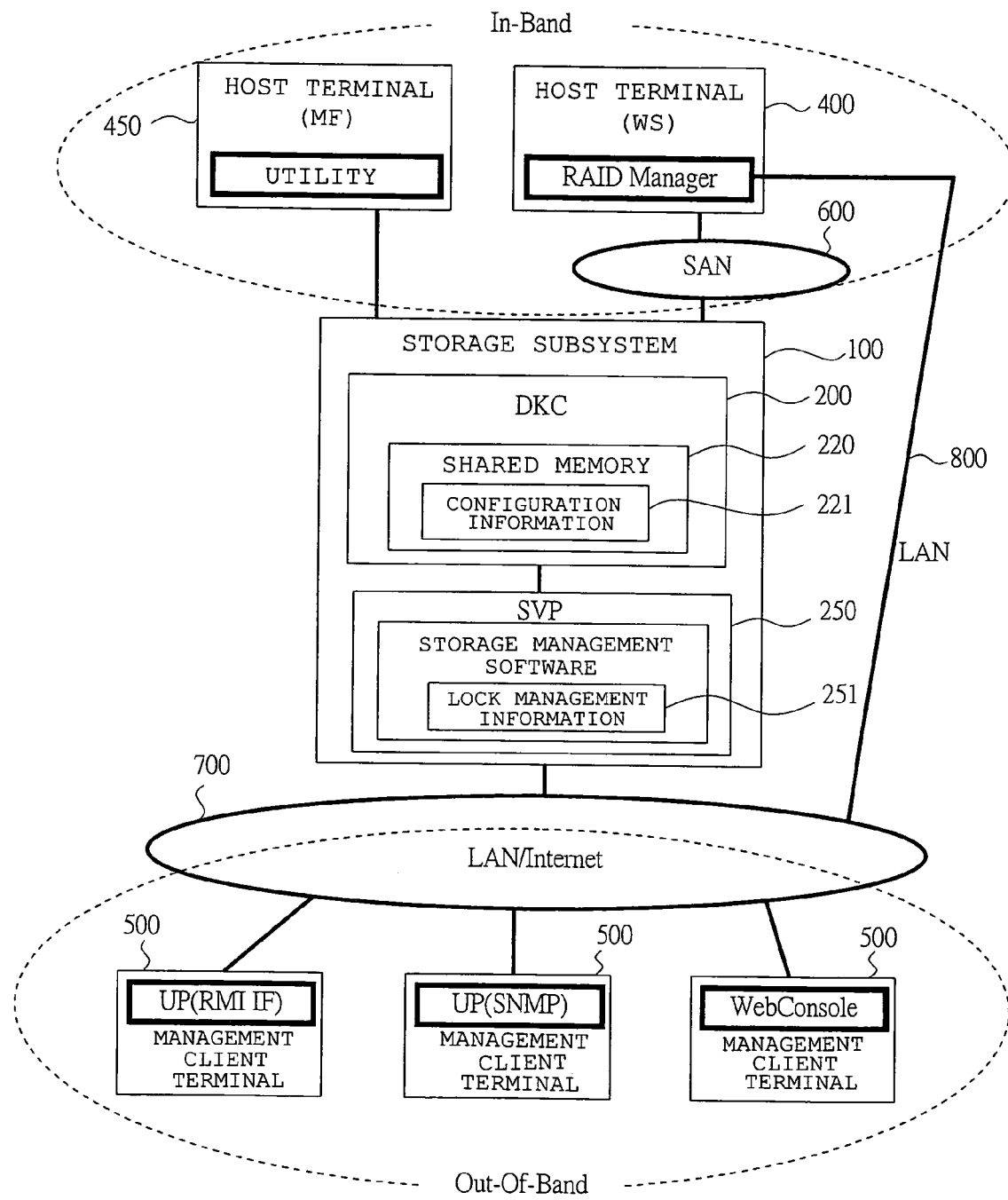
FIG. 15 is a schematic diagram showing another configuration of In-Band and Out-of-Band in a storage system according to an embodiment of the present invention.

An example of another In-Band/Out-of-Band configuration in the storage system according to this embodiment will be described with reference to FIG. 15. FIG. 15 is a schematic diagram showing another configuration of the In-Band and the Out-of-Band in the storage system according to this embodiment.

In the storage system according to this embodiment, another In-Band/Out-of-Band configuration is an embodiment in which the host terminal (RAID Manager) 400 and a LAN/Internet 700 are connected via a LAN 800 and the lock management information 251 is held at not the DKC 200 (shared memory 220) but the SVP 250, and in this state, communications are performed between the RAID Manager and the SVP 250 and the lock management is carried out.

In concrete, similar to the terminal of the Out-of-Band, the RAID Manager issues an operation authority acquisition command and the like via the LAN 800 and manages the operation authority via the SVP 250, thereby, the control the same as that mentioned above in FIG. 2 is realized.

EFFECTS OF THE PRESENT PREFERRED EMBODIMENTS

According to the embodiments above, the following effects can be obtained in the storage system of the In-Band/Out-of-Band configuration.

(1) The lock management information 222 (222a, 222b) including an identifier of a terminal (user) having the operation authority, acquisition time of the operation authority, remaining time limit and so forth is stored in the shared memory 220 in the DKC 200 of the storage subsystem 100 (however, in the SVP 250 in another configuration (FIG. 15)), and this lock management information 222 is used in common by the terminals (users) that are accessed from both the channels of the In-Band and the Out-of-Band. By so doing, the number of terminals (users) having the operation authority can be limited to one. As a result, it is possible to uniformly manage the operation authority for the storage subsystem 100 and also to remove the factor causing the discrepancy in the configuration information.

(2) The remaining time limit for a user having the operation authority is displayed on a screen to show it to the user by using the remaining time limit acquisition function. By so doing, it is possible for the user to confirm how long the user can hold the operation authority. As a result, it is possible for a user having the operation authority to grasp the remaining operation available time.

(3) When all the operations of configuration change are not completed within the time limit, it is possible for a user having the operation authority to extend the time limit by using the operation authority extension function. As a result, it is possible to prevent the operation authority from being disabled in the course of the operation and the setting operation from becoming invalid.

(4) It is possible to display the remaining time limit of the user having the operation authority to the users not having operation authority by using the remaining time acquisition function.

(5) When a user having the operation authority leaves the terminal thereof with holding the operation authority and if the remaining time limit expires, it is possible to take away the operation authority by using the operation authority forced release function.

(6) Before the expiration of the remaining time limit of a user having the operation authority, it is possible for a third party (administrator) to disable the operation authority by using the operation authority forced release function.

(7) It is possible to view the configuration information of the exclusive lock management and acquire the lock management information from the In-Band and also to manage the data safely from the interface of only the In-band without the LAN. In addition, it is also possible to manage the data safely from the interface of only the Out-of-Band.

In the foregoing, the invention by the inventors of the present invention has been concretely described with the embodiments. However, it is needless to say that the present invention is not limited to the foregoing embodiments and the invention may be embodied in other specific forms without departing from the spirit and essential characteristics thereof.

What is claimed is:

1. A storage system, comprising:
a disk array system including plural storage devices that carry out data write or read to memory areas, a storage device control unit that controls data write or read to said plural storage devices, a channel control unit that receives a write request or a read request from a host machine connected to a network outside said disk array system, a shared memory to which control information including configuration information communicated by said channel control unit and said storage device control unit is stored, a cache memory to which data communicated between said channel control unit and said storage device control unit is temporarily stored, a connection unit that is connected to said channel control unit, said storage device control unit, said shared memory and said cache memory, and a management terminal, that is connected to said channel control unit, said storage device control unit and said shared memory, which controls said disk array system;
wherein said host machine is connected to said channel control unit in said disk array system via a first network/interface; and
a management client that is connected to said management terminal in said disk array system via a second network/interface that is physically and logically different from said first network/interface,
wherein said shared memory in said disk array system has management information for uniformly managing operation authority for the configuration information in said shared memory that is used in common by both of said host machine and said management client, and
wherein said channel control unit has a function to give the operation authority for changing said configuration information to either said host machine or said management client based on said control information in said shared memory in response to an access request from said host machine or said management client,
wherein said management information includes an identifier of an operator having the operation authority, acquisition time of the operation authority, and release scheduled time of the operation authority,
wherein said channel control unit gives the operation authority with a time limit from said acquisition time to said release scheduled time to an operator who has said operation authority based on said identifier of the operator, said acquisition time, and said release scheduled time,
wherein said management information further includes initial operation authority holding time, and
wherein said channel control unit determines the time limit from said acquisition time to said release scheduled time based on said initial operation authority holding time.

2. A storage system according to claim 1, wherein said initial operation authority holding time can be changed from said host machine or said management client by an operator who has said operation authority.

3. A storage system according to claim 1, wherein said channel control unit has a function to display said time limit for an operator having said operation authority to show said time limit to the operator on a screen of said host machine or said management client.

4. A storage system according to claim 1, wherein said channel control unit has a function to check said management information in said shared memory in response to an access request from said host machine or said management client to determine whether to give or not give the operation authority for changing the configuration information to either said host machine or said management client based on the check of said management information in said shared memory.

5. A storage system according to claim 2, wherein said initial operation authority holding time can be held in each of a plurality of host machines or a plurality of management clients and can be changed in each of said host machines or said management clients.

6. A storage system, comprising:
a disk array system including plural storage devices that carry out data write or read to memory areas, a storage device control unit that controls data write or read to said plural storage devices, a channel control unit that receives a write request or a read request from a host machine connected to a network outside said disk array system, a shared memory to which control information including configuration information communicated by said channel control unit and said storage device control unit is stored, a cache memory to which data communicated between said channel control unit and said storage device control unit is temporarily stored, a connection unit that is connected to said channel control unit, said storage device control unit, said shared memory and said cache memory, and a management terminal, that is connected to said channel control unit, said storage device control unit and said shared memory, which controls said disk array system;
wherein said host machine is connected to said channel control unit in said disk array system via a first network/interface; and
a management client that is connected to said management terminal in said disk array system via a second network/interface that is physically and logically different from said first network/interface,
wherein said shared memory in said disk array system has management information for uniformly managing operation authority for the configuration information in said shared memory that is used in common by both of said host machine and said management client, and
wherein said channel control unit has a function to give the operation authority for changing said configuration information to either said host machine or said management client based on said control information in said shared memory in response to an access request from said host machine or said management client,
wherein said management information includes an identifier of an operator having the operation authority, acquisition time of the operation authority, and release scheduled time of the operation authority, wherein said channel control unit gives the operation authority with a time limit from said acquisition time to said release scheduled time to an operator who has said operation authority based on said identifier of the operator, said acquisition time, and said release scheduled time, wherein said management information further includes additional time in an extension process, and wherein when receiving an extension request from an operator who has said operation authority, said channel control unit changes said release scheduled time of the operation authority based on said additional time for the extension process and gives the operation authority with the time limit until said changed release scheduled time.

7. A storage system according to claim 6, wherein said additional time for the extension process can be changed from said host machine or said management client by an operator who has said operation authority.

8. A storage system according to claim 6, wherein said channel control unit has a function to display said changed time limit for an operator having said operation authority to show said changed time limit to the operator on a screen of said host machine or said management client.

9. A storage system according to claim 6, wherein said channel control unit has a function to check said management information in said shared memory in response to an access request from said host machine or said management client to determine whether to give or not give the operation authority for changing the configuration information to either said host machine or said management client based on the check of said management information in said shared memory.

10. A storage system according to claim 7, wherein said additional time for the extension process can be held in each of a plurality of host machines or a plurality of management clients and can be changed in each of said host machines or said management clients.

11. A method for controlling a storage system which includes a disk array system having plural storage devices that carry out data write or read to memory areas, a storage device control unit that controls data write or read to said plural storage devices, a channel control unit that receives a write request or a read request from a host machine connected to a network outside said disk array system, a shared memory to which control information including configuration information communicated by said channel control unit and said storage device control unit is stored, a cache memory to which data communicated between said channel control unit and said storage device control unit is temporarily stored, a connection unit that is connected to said channel control unit, said storage device control unit, said shared memory and said cache memory, and a management terminal, that is connected to said channel control unit, said storage device control unit and said shared memory, which controls said disk array system, wherein said host machine is connected to said channel control unit in said disk array system via a first network/interface, and a management client that is connected to said management terminal in said disk array system via a second network/interface that is physically and logically different from said first network/interface, said method comprising:

storing, in said shared memory in said disk array system, management information for uniformly managing operation authority for the configuration information in said shared memory that is used in common by both of said host machine and said management client, and giving, by said channel control unit, the operation authority for changing said configuration information to either said host machine or said management client based on said control information in said shared memory in response to an access request from said host machine or said management client, wherein said management information further includes initial operation authority holding time, and determining, by said channel control unit, the time limit from said acquisition time to a release scheduled time based on said initial operation authority holding time.

12. A method according to claim 11, further comprising:

checking, by a function in said channel control unit, in response to an access request from said host machine or said management client to determine whether to give or not give the operation authority for changing the configuration information to either said host machine or said management client based on the checking of said management information in said shared memory.

13. A method according to claim 11, wherein said management information includes an identifier of an operator having the operation authority, acquisition time of the operation authority, and release scheduled time of the operation authority, and wherein said channel control unit gives the operation authority with a time limit from said acquisition time to said release scheduled time to an operator who has said operation authority based on said identifier of the operator, said acquisition time, and said release scheduled time.

14. A method for controlling a storage system which includes a disk array system having plural storage devices that carry out data write or read to memory areas, a storage device control unit that controls data write or read to said plural storage devices, a channel control unit that receives a write request or a read request from a host machine connected to a network outside said disk array system, a shared memory to which control information including configuration information communicated by said channel control unit and said storage device control unit is stored, a cache memory to which data communicated between said channel control unit and said storage device control unit is temporarily stored, a connection unit that is connected to said channel control unit, said storage device control unit, said shared memory and said cache memory, and a management terminal, that is connected to said channel control unit, said storage device control unit and said shared memory, which controls said disk array system, wherein said host machine is connected to said channel control unit in said disk array system via a first network/interface, and a management client that is connected to said management terminal in said disk array system via a second network/interface that is physically and logically different from said first network/interface, said method comprising:

storing, in said shared memory in said disk array system, management information for uniformly managing operation authority for the configuration information in said shared memory that is used in common by both of said host machine and said management client, and giving, by said channel control unit, the operation authority for changing said configuration information to either said host machine or said management client based on said control information in said shared memory in response to an access request from said host machine or said management client, wherein said management information includes an identifier of an operator having the operation authority, acquisition time of the operation authority, and release scheduled time of the operation authority, giving, by said channel control unit, the operation authority with a time limit from said acquisition time to said release scheduled time to an operator who has said operation authority based on said identifier of the operator, said acquisition time, and said release scheduled time, and changing an initial operation authority holding time from said host machine or said management client by an operator who has said operation authority.

15. A method for controlling a storage system according to claim 14, wherein said initial operation authority holding time can be held in each of a plurality of host machines or a plurality of management clients and can be changed in each of said host machines or said management clients.

16. A method according to claim 14, further comprising:
checking, by a function in said channel control unit, in response to an access request from said host machine or said management client to determine whether to give or not give the operation authority for changing the configuration information to either said host machine or said management client based on the checking of said management information in said shared memory.

17. A method for controlling a storage system which includes a disk array system having plural storage devices that carry out data write or read to memory areas, a storage device control unit that controls data write or read to said plural storage devices, a channel control unit that receives a write request or a read request from a host machine connected to a network outside said disk array system, a shared memory to which control information including configuration information communicated by said channel control unit and said storage device control unit is stored, a cache memory to which data communicated between said channel control unit and said storage device control unit is temporarily stored, a connection unit that is connected to said channel control unit, said storage device control unit, said shared memory and said cache memory, and a management terminal, that is connected to said channel control unit, said storage device control unit and said shared memory, which controls said disk array system, wherein said host machine is connected to said channel control unit in said disk array system via a first network/interface, and a management client that is connected to said management terminal in said disk array system via a second network/interface that is physically and logically different from said first network/interface, said method comprising:

storing, in said shared memory in said disk array system, management information for uniformly managing operation authority for the configuration information in said shared memory that is used in common by both of said host machine and said management client, and giving, by said channel control unit, the operation authority for changing said configuration information to either said host machine or said management client based on said control information in said shared memory in response to an access request from said host machine or said management client, wherein said management information includes an identifier of an operator having the operation authority, acquisition time of the operation authority, and release scheduled time of the operation authority, giving, by said channel control unit, the operation authority with a time limit from said acquisition time to said release scheduled time to an operator who has said operation authority based on said identifier of the operator, said acquisition time, and said release scheduled time; and displaying, by a function in said channel control unit, said time limit for an operator having said operation authority to show said time limit to the operator on a screen of said host machine or said management client.

18. A method for controlling a storage system which includes a disk array system having plural storage devices that carry out data write or read to memory areas, a storage device control unit that controls data write or read to said plural storage devices, a channel control unit that receives a write request or a read request from a host machine connected to a network outside said disk array system, a shared memory to which control information including configuration information communicated by said channel control unit and said storage device control unit is stored, a cache memory to which data communicated between said channel control unit and said storage device control unit is temporarily stored, a connection unit that is connected to said channel control unit, said storage device control unit, said shared memory and said cache memory, and a management terminal, that is connected to said channel control unit, said storage device control unit and said shared memory, which controls said disk array system, wherein said host machine is connected to said channel control unit in said disk array system via a first network/interface, and a management client that is connected to said management terminal in said disk array system via a second network/interface that is physically and logically different from said first network/interface, said method comprising:

storing, in said shared memory in said disk array system, management information for uniformly managing operation authority for the configuration information in said shared memory that is used in common by both of said host machine and said management client, and giving, by said channel control unit, the operation authority for changing said configuration information to either said host machine or said management client based on said control information in said shared memory in response to an access request from said host machine or said management client, wherein said management information includes an identifier of an operator having the operation authority, acquisition time of the operation authority, and release scheduled time of the operation authority, giving, by said channel control unit, the operation authority with a time limit from said acquisition time to said release scheduled time to an operator who has said operation authority based on said identifier of the operator, said acquisition time, and said release scheduled time, wherein said management information further includes additional time in an extension process; and when receiving an extension request from an operator who has said operation authority, changing, by said channel control unit, said release scheduled time of the operation authority based on said additional time for the extension process and giving the operation authority with the time limit until said changed release scheduled time.

19. A method for controlling a storage system according to claim 18, wherein said additional time for the extension process can be changed from said host machine or said management client by an operator who has said operation authority.

20. A method for controlling a storage system according to claim 18, further comprising:
   displaying, by a function in said channel control unit said changed time limit for an operator having said operation authority to show said changed time limit to the operator on a screen of said host machine or said management client.

21. A method for controlling a storage system according to claim 19, wherein said additional time for the extension process can be held in each of a plurality of host machines or a plurality of management clients and can be changed in each of said host machines or said management clients.

* * * * *